(12) United States Patent
Proctor

(10) Patent No.: US 9,335,412 B2
(45) Date of Patent: May 10, 2016

(54) SONAR TRANSDUCER ASSEMBLY

(71) Applicant: Navico Holding AS, Egersund (NO)

(72) Inventor: Alan Proctor, Owasso, OK (US)

(73) Assignee: Navico Holding AS, Egersund (NO)

( * ) Notice: Subject to any disclaimer, the term of this patent is extended or adjusted under 35 U.S.C. 154(b) by 551 days.

(21) Appl. No.: 13/827,329

(22) Filed: Mar. 14, 2013

(65) Prior Publication Data

US 2014/0269192 A1 Sep. 18, 2014

(51) Int. Cl.
G01S 15/00 (2006.01)
G01S 15/89 (2006.01)
G01S 7/56 (2006.01)
G01S 15/96 (2006.01)

(52) U.S. Cl.
CPC . *G01S 15/89* (2013.01); *G01S 7/56* (2013.01); *G01S 15/8902* (2013.01); *G01S 15/96* (2013.01); *Y10T 29/49002* (2015.01)

(58) Field of Classification Search
USPC .......................................................... 367/88
See application file for complete search history.

(56) References Cited

U.S. PATENT DOCUMENTS

| 5,077,699 | A | 12/1991 | Passamante et al. |
| 5,530,680 | A | 6/1996 | Whitehurst |
| 5,537,380 | A | 7/1996 | Sprankle et al. |
| 5,568,152 | A | 10/1996 | Janky et al. |
| 5,675,552 | A | 10/1997 | Hicks et al. |
| 5,805,528 | A | 9/1998 | Hamada et al. |
| 7,369,459 | B2 | 5/2008 | Kawabata et al. |
| 7,542,376 | B1 | 6/2009 | Thompson et al. |
| 7,652,952 | B2 | 1/2010 | Betts et al. |
| 7,729,203 | B2 * | 6/2010 | Betts et al. ...................... 367/88 |
| 7,889,600 | B2 | 2/2011 | Thompson et al. |
| 8,295,393 | B2 | 10/2012 | Watanabe et al. |
| 8,300,499 | B2 * | 10/2012 | Coleman et al. ................ 367/88 |

(Continued)

FOREIGN PATENT DOCUMENTS

JP 01-118791 A 5/1989
JP 01-216288 A 8/1989

(Continued)

OTHER PUBLICATIONS

Office Action from Japanese Patent Application No. 2014-051465 dated Feb. 23, 2015.

(Continued)

*Primary Examiner* — James Hulka
(74) *Attorney, Agent, or Firm* — Alston & Bird LLP

(57) ABSTRACT

A sonar transducer assembly configured for imaging of an underwater environment is provided herein. The sonar transducer assembly includes at least one transmit-only transducer element positioned within a housing and aimed outwardly and downwardly. The at least one transmit-only transducer element is configured to transmit sonar pulses to insonify a first volume. The sonar transducer assembly further includes at least one receive-only transducer element positioned within the housing and aimed outwardly and downwardly. The at least one receive-only transducer element is configured to receive sonar returns from the sonar pulses within a second volume. The second volume is smaller than the first volume and aimed so as to be wholly contained within the first volume. The housing is mountable to the water craft so as to enable rotation of the transducer elements with respect to the water craft. Corresponding systems and methods are also provided.

31 Claims, 13 Drawing Sheets

(56) References Cited

U.S. PATENT DOCUMENTS

| | | | |
|---|---|---|---|
| 8,305,840 B2* | 11/2012 | Maguire | 367/88 |
| 8,305,844 B2 | 11/2012 | DePasqua | |
| 8,514,658 B2* | 8/2013 | Maguire | 367/88 |
| 8,605,550 B2* | 12/2013 | Maguire | 367/88 |
| 8,717,847 B2* | 5/2014 | Blake | 367/88 |
| 8,879,359 B2* | 11/2014 | DePasqua | 367/103 |
| 2003/0235112 A1 | 12/2003 | Zimmerman et al. | |
| 2007/0291589 A1* | 12/2007 | Kawabata et al. | 367/88 |
| 2009/0103595 A1 | 4/2009 | Watanabe et al. | 375/219 |
| 2009/0147623 A1 | 6/2009 | Betts et al. | |
| 2010/0014386 A1 | 1/2010 | Thompson et al. | |
| 2010/0103775 A1 | 4/2010 | Betts et al. | |
| 2011/0013484 A1* | 1/2011 | Coleman et al. | 367/88 |
| 2011/0013485 A1* | 1/2011 | Maguire | 367/88 |
| 2012/0014220 A1 | 1/2012 | DePasqua | |
| 2013/0044569 A1 | 2/2013 | DePasqua | |
| 2013/0148471 A1 | 6/2013 | Brown et al. | |
| 2013/0215719 A1 | 8/2013 | Betts et al. | |
| 2013/0242700 A1 | 9/2013 | Blake | |

FOREIGN PATENT DOCUMENTS

| | | |
|---|---|---|
| JP | 11-153667 A | 6/1999 |
| JP | 2008-508539 A | 3/2008 |
| JP | 2009-068881 A | 4/2009 |
| WO | WO 03/001231 A2 | 1/2003 |
| WO | WO 2006/017511 A2 | 2/2006 |
| WO | WO 2011/008430 A1 | 1/2011 |

OTHER PUBLICATIONS

"*Furuno CH-28 360° Scanning Sonar*", 8 pages.

Furuno, *Operator's Manual, Color Searchlight Sonar; Model CH-28*; Furuno Electric Co., Ltd.; Nishinomiya, Japan, First Edition Jan. 1991; 44 pages.

Humminbird, "Trolling Motor Mounted Transducer", © 2013 Johnson Outdoors Marine Electronics, Inc.; pp. 1-4.

International Search Report and Written Opinion from International Application No. PCT/US2014/023984, mailed Sep. 1, 2014.

Office Action for Japanese Application No. 2014-051465 dated Jul. 27, 2015.

U.S. Appl. No. 13/314,574, filed Dec. 8, 2011; first named inventor: Priepke et al.

*Full-Circle Scanning Sonar FSV-30*, [online] [retrieved Apr. 18, 2013] Retrieved from the Internet: <URL: http://www.furuno.com/en/business_product/detail/marine/index.php?prdcd=FSV-30&category=sonar&business=fishing>.

*ITC Application Equations for Underwater Sound Transducers*, Published by International Transducer Corporation, Rev. 8/00 (1995) 3 pages.

*Simrad Introduces Forwardscan* [online] [Retrieved Nov. 25, 2014]. Retrieved from the Internet: <URL: http://www.simrad-yachting.com/en-US/Pressreleases/2014/Simrad-Introduces-Forwardscan/>. 2 pages.

*ForwardScan® Transducer* [online] [Retrieved Mar. 25, 2015]. Retrieved from the Internet: <URL: http://www.simrad-yachting.com/en-GB/Products/Echosounders/Transducers/ForwardScan-Transducer-en-gb.aspx>. 3 pages.

*NOAA; Office of Coast Survey; Phase Differencing Bathymetric Sonar* [online] [Retrieved May 5, 2015]. Retrieved from the Internet: <URL: http://www.nauticalcharts.noaa.gov/csdl/PDBS.html>. 2 pages.

*Swath Bathymetry System* [online] [Retrieved May 5, 2015]. Retrieved from the Internet: URL:http://woodshole.er.usgs.gov/operations/sfmapping/swath.htm. 2 pages.

*Solving the Interferometric Processing Bottleneck* [online] [Retrieved May 5, 2015]. Retrieved from the Internet: <URL: http://www.oicinc.com/Hiller_Solving-Interferometric-Bottleneck.pdf>. 3 pages.

Second Written Opinion of the International Preliminary Examining Authority from International Application No. PCT/US2014/023984, mailed Mar. 5, 2015.

U.S. Appl. No. 14/618,987, filed Feb. 10, 2015.

Office Action for Japanese Application No. 2014-051465 dated Mar. 2, 2016.

* cited by examiner

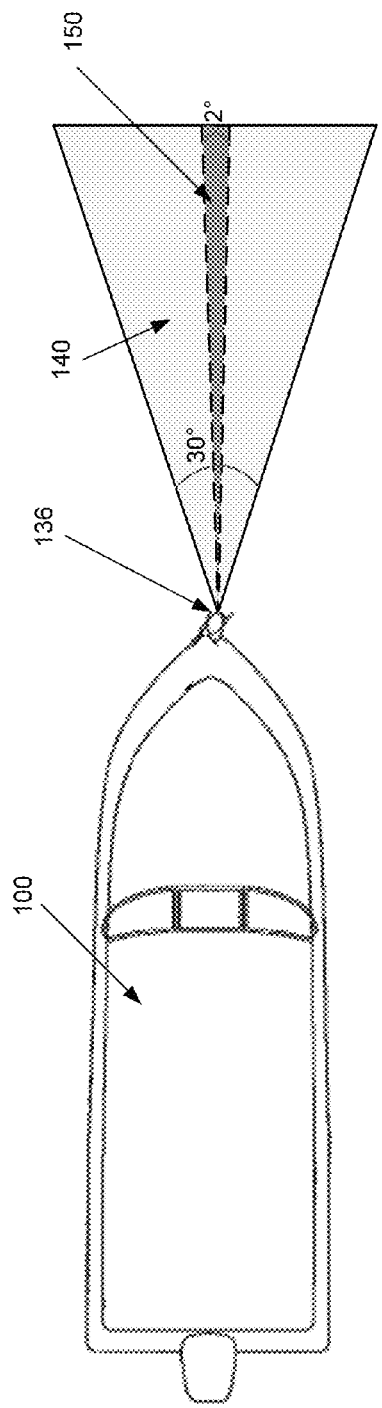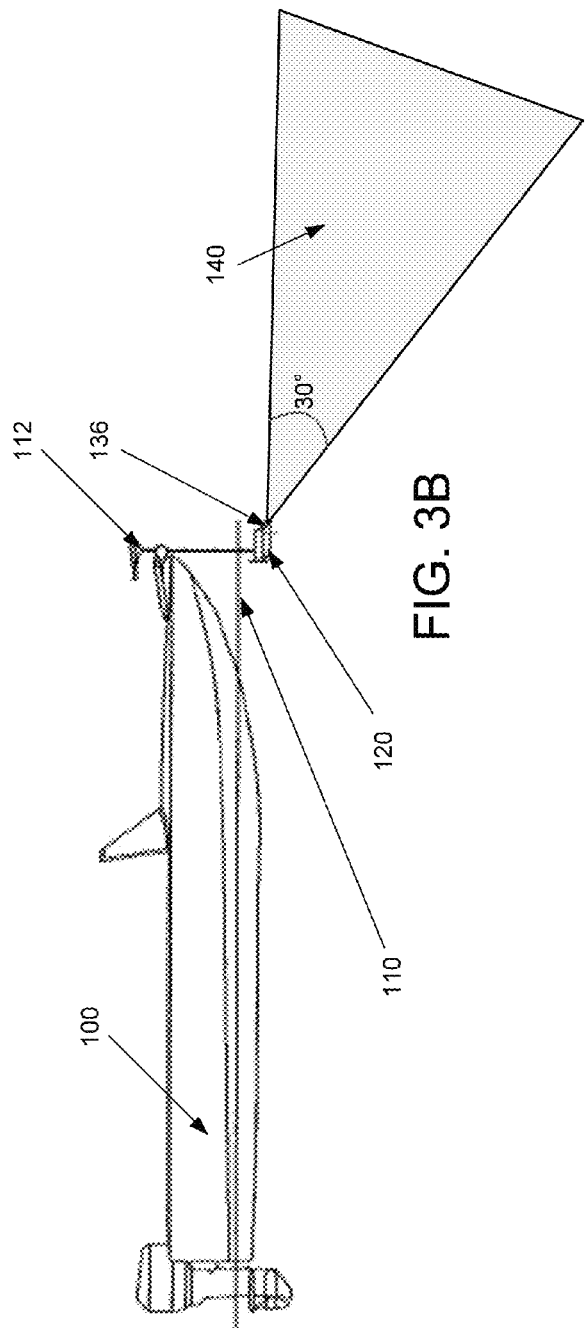
FIG. 3A
FIG. 3B

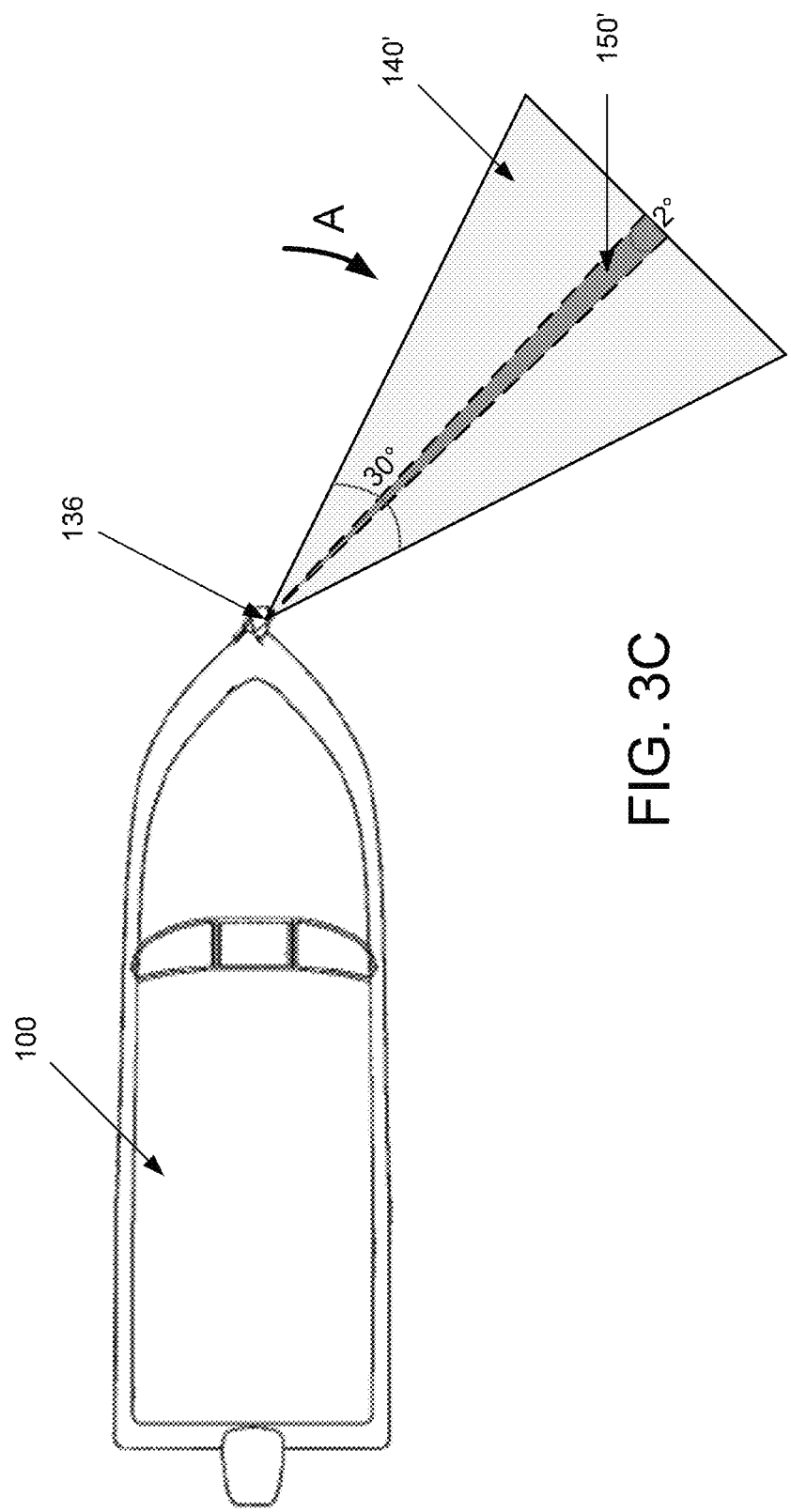

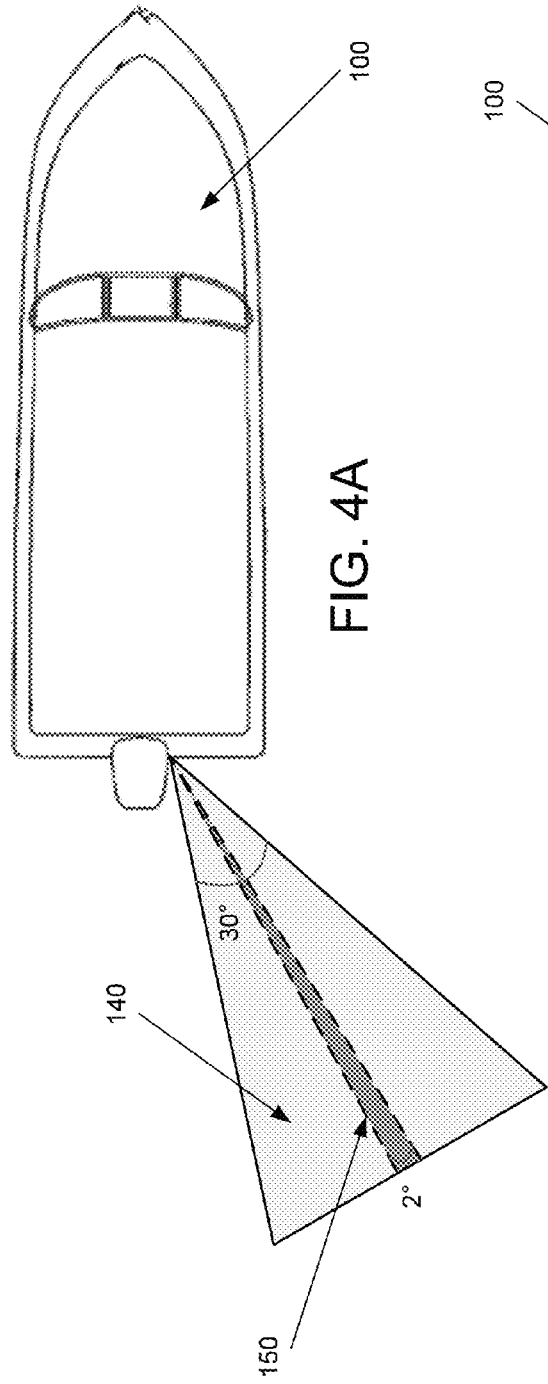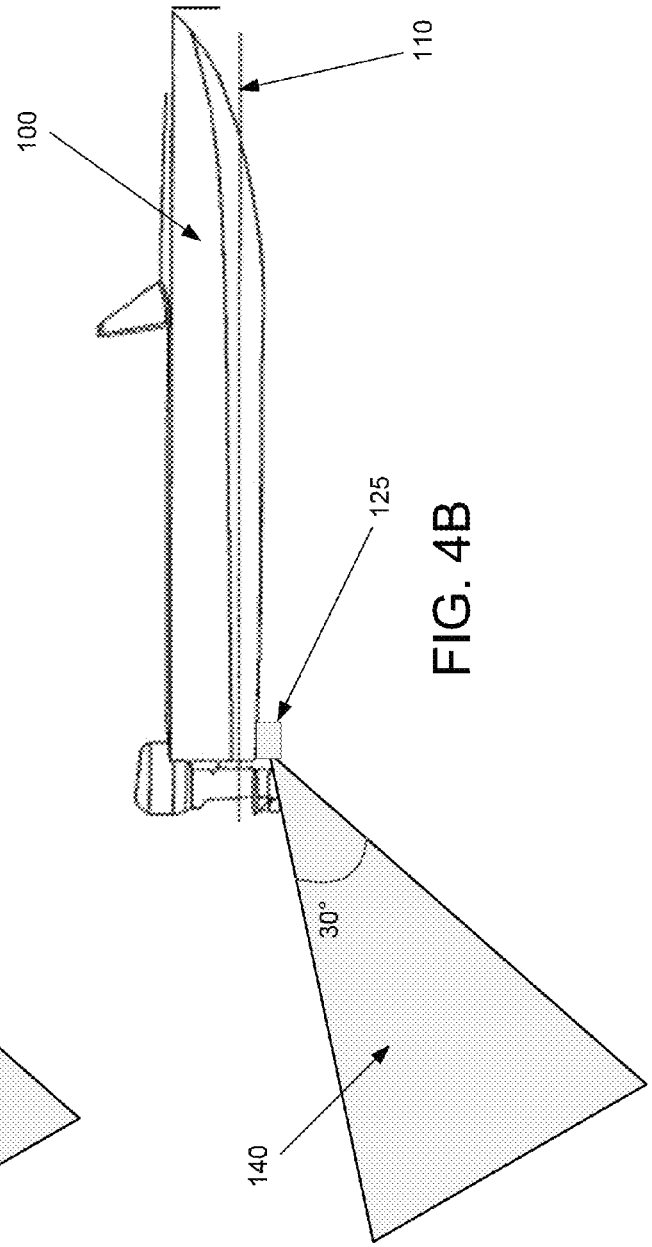
FIG. 4A
FIG. 4B

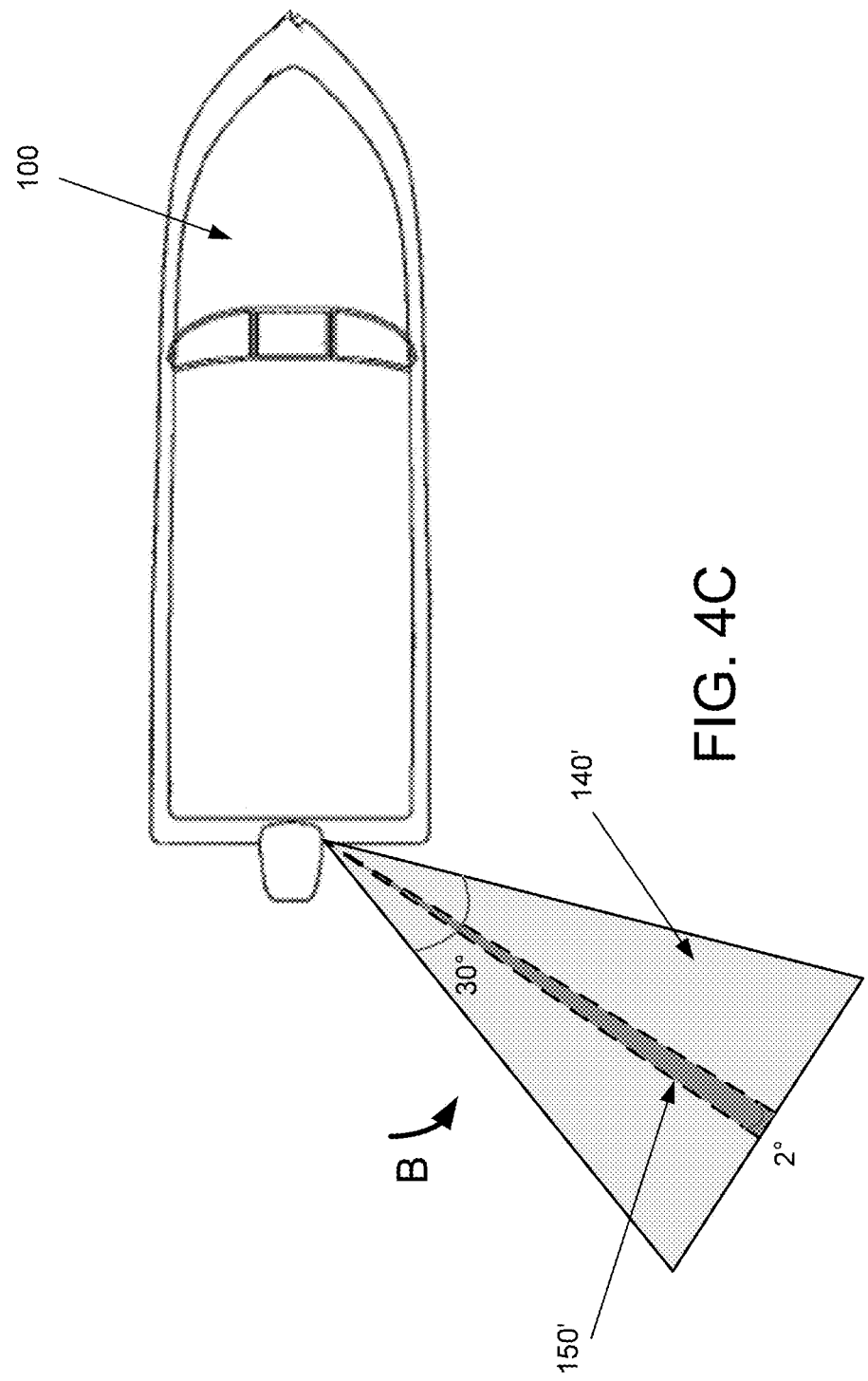

SONAR TRANSDUCER ASSEMBLY

FIELD OF THE INVENTION

Embodiments of the present invention relate generally to sonar systems and, more particularly, to a sonar transducer assembly configured for 360 degree imaging of an underwater environment under a water craft.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be displayed in graphical form on a display device, giving the user a "picture" of the underwater environment. The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Sonar systems may be used, in some cases, to create an image of an underwater environment. However, some sonar systems may be limited in their capabilities, such as requiring a water craft to actively travel along the surface of the water in order to acquire the necessary sonar return data to form the image. As such, improved sonar systems are needed to provide for enhanced techniques for creating an image of an underwater environment.

BRIEF SUMMARY OF THE INVENTION

As such, some embodiments of the present invention provide sonar systems that are configured to enable rotation of the transducer elements such that a 360 degree image of the underwater environment can be obtained. In some cases, the transducer assembly may be configured to mount to the water craft and enable rotation of the transducer elements. Alternatively, the transducer assembly may be mounted to a trolling motor that can be rotated to obtain a 360 degree image of the underwater environment. Such embodiments may be useful in imaging an underwater environment while the water craft is stationary or merely floating in the water.

Additionally, some embodiments of the present invention provide a transducer assembly that enables imaging while the transducer assembly rotates at variable speeds. Indeed, such a design may improve on some transducer assemblies that require a pause in between transmission of sonar pulses and receipt of sonar returns. Such a pause ultimately dictates the rotation of the transducer assembly and, thus, the corresponding image creation. In this regard, in some embodiments, the transducer assembly may be configured to collect sonar return data without having to pause during rotation (e.g., the transducer assembly may provide an image of the underwater environment even though it is continuously rotated). Such an embodiment may even allow for a user to define the speed of rotation of the transducer assembly.

Accordingly, embodiments of the present invention provide a sonar system that is configured for 360 degree imaging of an underwater environment under a water craft.

In an example embodiment, a sonar transducer assembly for a water craft is provided. The sonar transducer assembly comprises at least one transmit-only transducer element positioned within a housing and aimed outwardly and downwardly. The at least one transmit-only transducer element is configured to transmit sonar pulses to insonify a first volume. The sonar transducer assembly further comprises at least one receive-only transducer element positioned within the housing and aimed outwardly and downwardly. The at least one receive-only transducer element is configured to receive sonar returns from the sonar pulses within a second volume defined by a fan-shaped beam. The fan-shaped beam is defined by a relatively narrow beamwidth in a first plane and a relatively wide beamwidth in a second plane that is perpendicular to the first plane. The second volume is smaller than the first volume and the at least one receive-only transducer element is aimed within the housing such that the second volume is wholly contained within the first volume. The housing is mountable to the water craft so as to enable rotation of the at least one transmit-only transducer element and the at least one receive-only transducer element with respect to the water craft.

In some embodiments, the housing is mountable to the water craft to enable approximately 360 degree rotation of the at least one transmit-only transducer element and the at least one receive-only transducer element with respect to the water craft.

In some embodiments, the at least one receive-only transducer element is further configured to convert sound energy of the sonar returns into sonar return data. Additionally, the sonar transducer assembly further comprises a sonar signal processor configured to receive sonar return data resulting from the at least one receive-only transducer element and process the sonar return data to produce sonar image data for the corresponding second volume. The sonar signal processor is further configured to create an image of an underwater environment as a composite of sonar images derived from the sonar image data of the second volumes respectively arranged in positions corresponding to the rotation of the at least one transmit-only transducer and the at least one receive-only transducer.

Additionally, in some embodiments, the sonar transducer assembly further comprises a heading sensor configured to detect the heading of the at least one receive-only transducer element. The detected heading of the at least one receive-only transducer element is associated with sonar return data for each second volume. The sonar signal processor is configured to create the image of the underwater environment based on the detected heading and associated sonar return data and a heading of the water craft.

Additionally, in some embodiments, the sonar signal processor is configured to process sonar returns to produce three-dimensional sonar image data. The sonar signal processor is configured to create a three-dimensional image of the underwater environment based on the three-dimensional sonar image data.

In some embodiments, the sonar transducer assembly further comprises transmitter circuitry in communication with the at least one transmit-only transducer element. The transmitter circuitry is configured to transfer a transmit signal to the transmit-only transducer element to cause the transmit-only transducer element to transmit the sonar pulses. The sonar transducer assembly further comprises receiver circuitry in communication with the receive-only transducer element. The receiver circuitry is configured to transfer said sonar return data from the receive-only transducer element for processing and generation of sonar image data for display to a user.

In some embodiments, the first volume is defined by a square-shaped beam. The square-shaped beam is defined by a relatively wide beamwidth in the first plane and the second plane.

In some embodiments, the at least one receive-only transducer element is configured to receive sonar returns from sonar pulses of the at least one transmit-only transducer element while the at least one transmit-only transducer element and the at least one receive-only transducer element are rotated at variable speeds.

In some embodiments, the at least one receive-only transducer element is configured to receive sonar returns from sonar pulses of the at least one transmit-only transducer element while the at least one transmit-only transducer element and the at least one receive-only transducer element are rotated at a user-defined speed.

In some embodiments, the at least one receive-only transducer element is configured to receive sonar returns from sonar pulses of the at least one transmit-only transducer element without the need to pause rotation of the at least one transmit-only transducer element and the at least one receive-only transducer element.

In some embodiments, the fan-shaped beam defines approximately a 2 degree angle in the first plane. In some embodiments, the first volume is defined by a square-shaped beam, and wherein the square-shaped beam defines approximately a 30 degree angle in the first plane.

In some embodiments, the at least one receive-only transducer element further comprises a second receive-only transducer element positioned within the housing and aimed outwardly and downwardly. The second receive-only transducer element is configured to receive sonar returns from the sonar pulses within a third volume defined by a second fan-shaped beam. The second fan-shaped beam is defined by a relatively narrow beamwidth in the first plane and a relatively wide beamwidth in the second plane. The third volume is smaller than the first volume and the at least one second receive-only transducer element is aimed within the housing such that the third volume is different than the second volume and wholly contained within the first volume.

In some embodiments, the sonar transducer assembly further comprises at least one second transmit-only transducer element positioned within the housing and aimed outwardly and downwardly. The at least one second transmit-only transducer element is configured to transmit sonar pulses to insonify a third volume different than the first volume. The sonar transducer assembly further comprises at least one second receive-only transducer element positioned within the housing and aimed outwardly and downwardly. The at least one second receive-only transducer element is configured to receive sonar returns from the sonar pulses of the at least one second transmit-only transducer element within a fourth volume defined by a second fan-shaped beam. The second fan-shaped beam is defined by a relatively narrow beamwidth in the first plane and a relatively wide beamwidth in the second plane. The fourth volume is smaller than the third volume. The at least one second receive-only transducer element is aimed within the housing such that the fourth volume is wholly contained within the third volume. The housing is mountable to the water craft so as to enable rotation of the at least one first transmit-only transducer element, the at least one first receive-only transducer element, the at least one second transmit-only transducer element, and the at least one second receive-only transducer element with respect to the water craft.

In some embodiments, the at least one receive-only transducer element defines a phased array receiver.

In some embodiments, the housing is configured to enable 360 degree rotation of the at least one transmit-only transducer element and the at least one receive-only transducer element.

In some embodiments, the housing is configured to be mounted to a rotatable trolling motor so as to enable 360 degree rotation of the at least one transmit-only transducer element and the at least one receive-only transducer element.

In another example embodiment, a sonar system for a water craft is provided. The sonar system comprises a transducer assembly comprising at least one transmit-only transducer element positioned within a housing and aimed outwardly and downwardly. The at least one transmit-only transducer element is configured to transmit sonar pulses to insonify a first volume. The transducer assembly further comprises at least one receive-only transducer element positioned within the housing and aimed outwardly and downwardly. The at least one receive-only transducer element is configured to receive sonar returns from the sonar pulses within a second volume defined by a fan-shaped beam. The fan-shaped beam is defined by a relatively narrow beamwidth in a first plane and a relatively wide beamwidth in a second plane that is perpendicular to the first plane. The second volume is smaller than the first volume. The at least one receive-only transducer element is aimed within the housing such that the second volume is wholly contained within the first volume. The at least one receive-only transducer element is further configured to convert sound energy of the sonar returns into sonar return data. The housing is mountable to the water craft so as to enable rotation of the at least one transmit-only transducer element and the at least one receive-only transducer element with respect to the water craft. The sonar system further comprises a sonar module configured to enable operable communication with the at least one transmit-only transducer element and the at least one receive-only transducer element. The sonar module includes a sonar signal processor to process sonar return signals and at least one transceiver configured to provide communication between the transducer assembly and the sonar signal processor. The sonar signal processor is configured to receive sonar return data resulting from the at least one receive-only transducer element and process the sonar return data to produce sonar image data for the corresponding second volume. The sonar signal processor is further configured to create an image of an underwater environment as a composite of sonar images derived from the sonar image data of the second volumes respectively arranged in positions corresponding to the rotation of the at least one transmit-only transducer and the at least one receive-only transducer.

In some embodiments, the housing is mountable to the water craft to enable approximately 360 degree rotation of the at least one transmit-only transducer element and the at least one receive-only transducer element with respect to the water craft.

In yet another example embodiment, a method for imaging an underwater environment beneath a water craft is provided. The method comprises transmitting sonar pulses from at least one transmit-only transducer element positioned within a housing and aimed outwardly and downwardly. Each of the sonar pulses are transmitted so as to insonify a first volume.

The method further comprises receiving sonar returns from the sonar pulses with at least one receive-only transducer element positioned within the housing and aimed outwardly and downwardly. The housing is mountable to the water craft so as to enable rotation of the at least one transmit-only transducer element and the at least one receive-only transducer element with respect to the water craft. The at least one receive-only transducer element is configured to receive sonar returns from the sonar pulses within a second volume defined by a fan-shaped beam. The fan-shaped beam is defined by a relatively narrow beamwidth in a first plane and a relatively wide beamwidth in a second plane that is perpendicular to the first plane. The second volume is smaller than the first volume. The at least one receive-only transducer element is aimed within the housing such that the second volume is wholly contained within the first volume. The at least one receive-only transducer element is further configured to convert sound energy of the sonar returns into sonar return data. The method further comprises processing, by a sonar signal processor, the sonar return data received from the at least one receive-only transducer element to produce sonar image data for display to a user.

In some embodiments, the housing is mountable to the water craft to enable approximately 360 degree rotation of the at least one transmit-only transducer element and the at least one receive-only transducer element with respect to the water craft.

In some embodiments, the method further includes transferring a transmit signal through transmitter circuitry in communication with the at least one transmit-only transducer element to cause the at least one transmit-only transducer element to transmit the sonar pulses. Additionally, the method further includes transferring the sonar return data indicative of the sonar returns received by the at least one receive-only transducer element through a first receiver circuitry in communication with the at least one receive-only transducer element to the sonar signal processor.

In some embodiments, the method further includes processing the sonar return data to produce sonar image data for the corresponding second volume. Additionally, the method further includes creating an image of the underwater environment as a composite of sonar images derived from the sonar image data of the second volumes respectively arranged in positions corresponding to the rotation of the at least one transmit-only transducer and the at least one receive-only transducer.

In yet another example embodiment, a method for assembling a sonar transducer system for a water craft is provided. The method includes providing a housing mountable to a water craft so as to enable 360 degree rotation of at least one transmit-only transducer element and at least one receive-only transducer element. The method further includes mounting the at least one transmit-only transducer element within the housing to aim outwardly and downwardly. The at least one transmit-only transducer element is configured to transmit sonar pulses to insonify a first volume. The method further includes mounting the at least one receive-only transducer element within the housing to aim outwardly and downwardly. The housing is mountable to the water craft so as to enable rotation of the at least one transmit-only transducer element and the at least one receive-only transducer element with respect to the water craft. The at least one receive-only transducer element is configured to receive sonar returns from the sonar pulses within a second volume defined by a fan-shaped beam. The fan-shaped beam is defined by a relatively narrow beamwidth in a first plane and a relatively wide beamwidth in a second plane that is perpendicular to the first plane. The second volume is smaller than the first volume. The at least one receive-only transducer element is aimed within the housing such that the second volume is wholly contained within the first volume. The at least one receive-only transducer element is further configured to convert sound energy of the sonar returns into sonar return data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 3A illustrates a top view of a water craft and an example sonar transducer assembly attached to a trolling motor of the watercraft, wherein the transducer assembly is shown emitting an example beam pattern that is defined by a transmit-only transducer element and a receive-only transducer element, in accordance with example embodiments described herein;

FIG. 3B illustrates a side view of the water craft, sonar transducer assembly, and beam pattern of FIG. 3A, in accordance with example embodiments described herein;

FIG. 3C illustrates a top view of the water craft and sonar transducer assembly of FIG. 3A, wherein the trolling motor has been rotated along arrow A such that the beam pattern has also been rotated, in accordance with example embodiments described herein;

FIG. 4A illustrates a top view of a water craft and another example sonar transducer assembly attached to the watercraft, wherein the transducer assembly is shown emitting an example beam pattern that is defined by a transmit-only transducer element and a receive-only transducer element, in accordance with example embodiments described herein;

FIG. 4B illustrates a side view of the water craft, sonar transducer assembly, and beam pattern of FIG. 4A, in accordance with example embodiments described herein;

FIG. 4C illustrates a top view of the water craft and sonar transducer assembly of FIG. 4A, wherein the transducer assembly has been rotated along arrow B such that the beam pattern has also been rotated, in accordance with example embodiments described herein;

Figure 8:
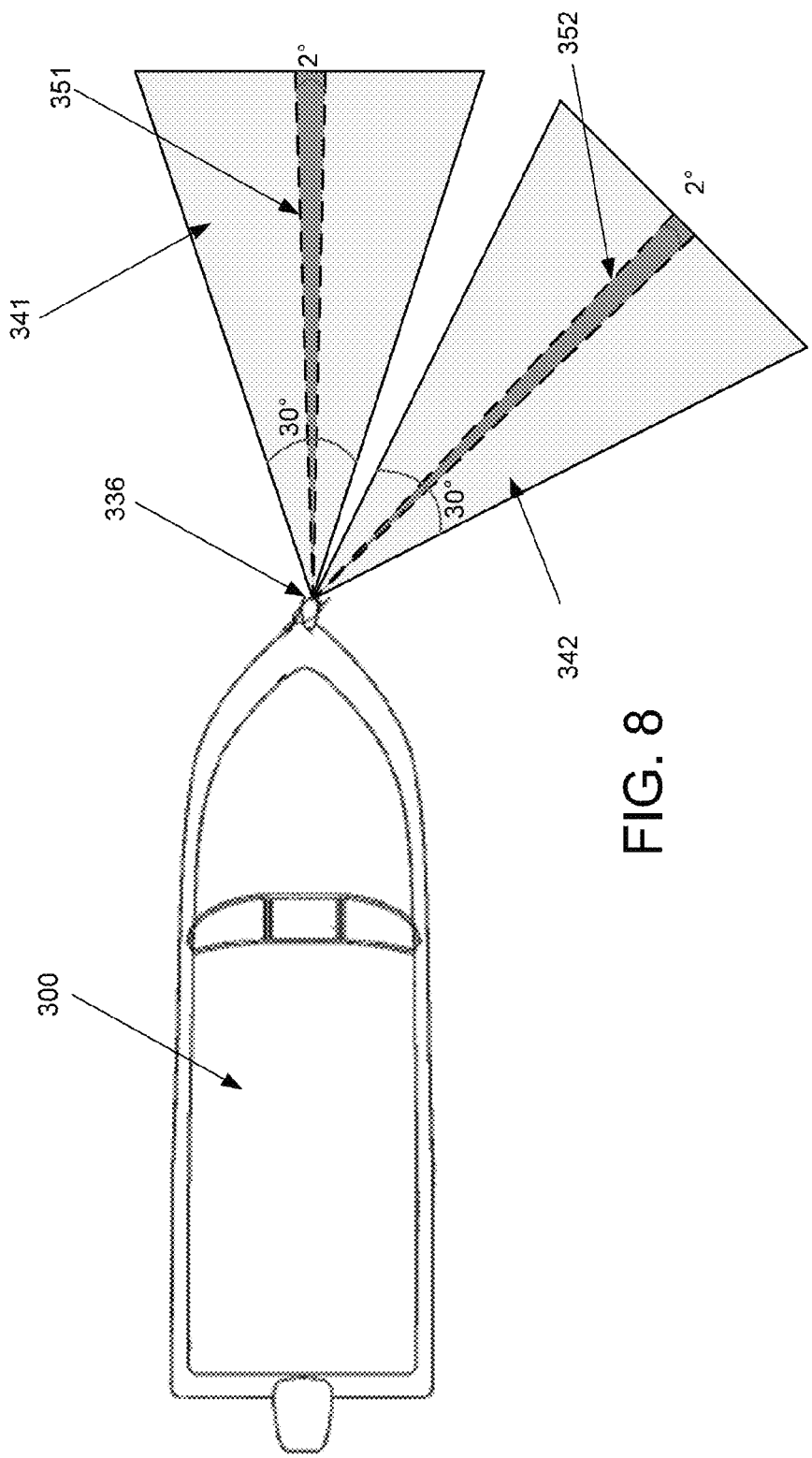
Figure 9:
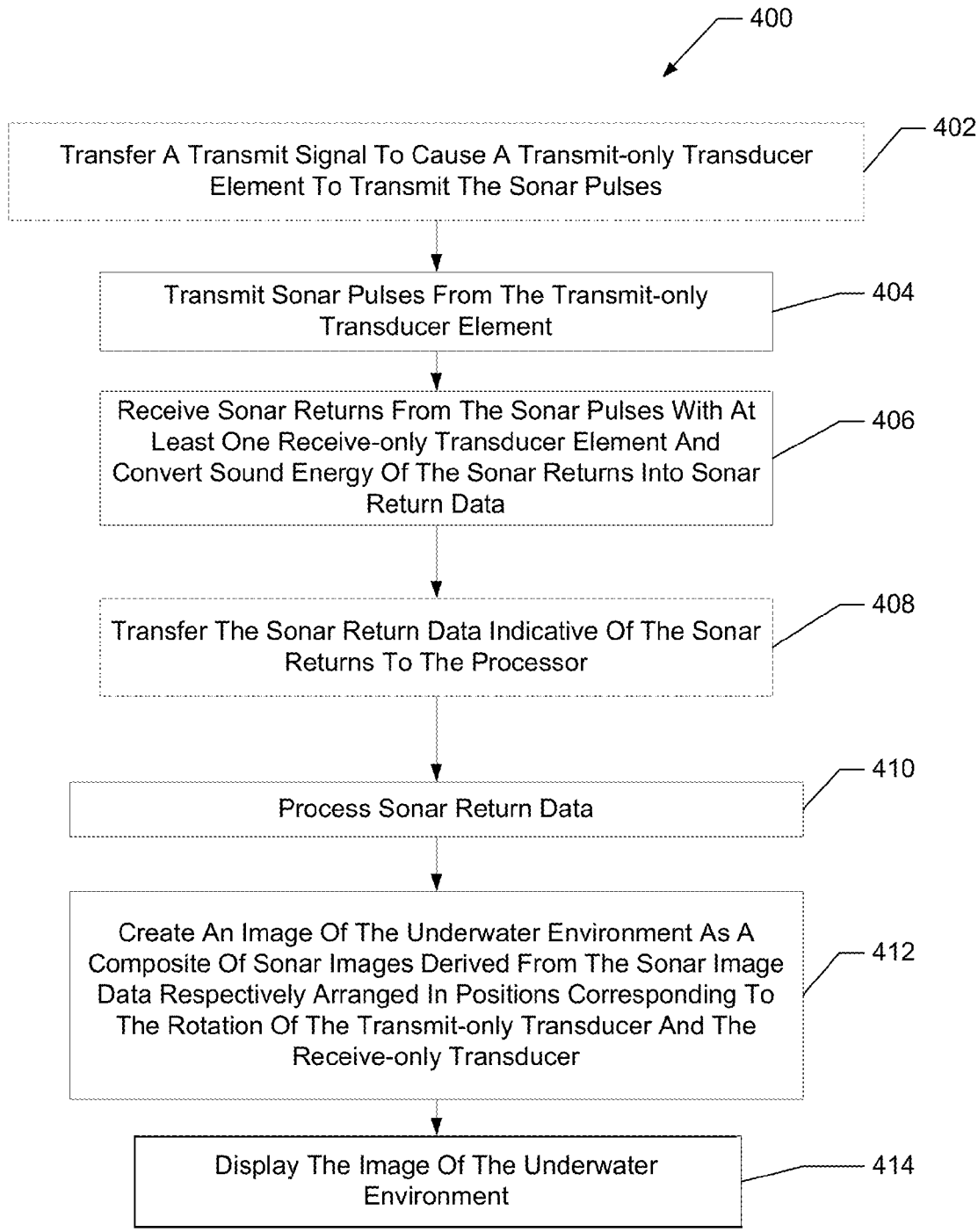

FIG. 8 illustrates a top view of a water craft and yet another example sonar transducer assembly attached to a trolling motor of the watercraft, wherein the transducer assembly is shown emitting an example beam pattern that is defined by two transmit-only transducer elements and two respective receive-only transducer elements, in accordance with example embodiments described herein; and FIG. 9 illustrates an example method of operating an example transducer assembly, in accordance with example embodiments described herein.

DETAILED DESCRIPTION OF THE INVENTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Figure 1:
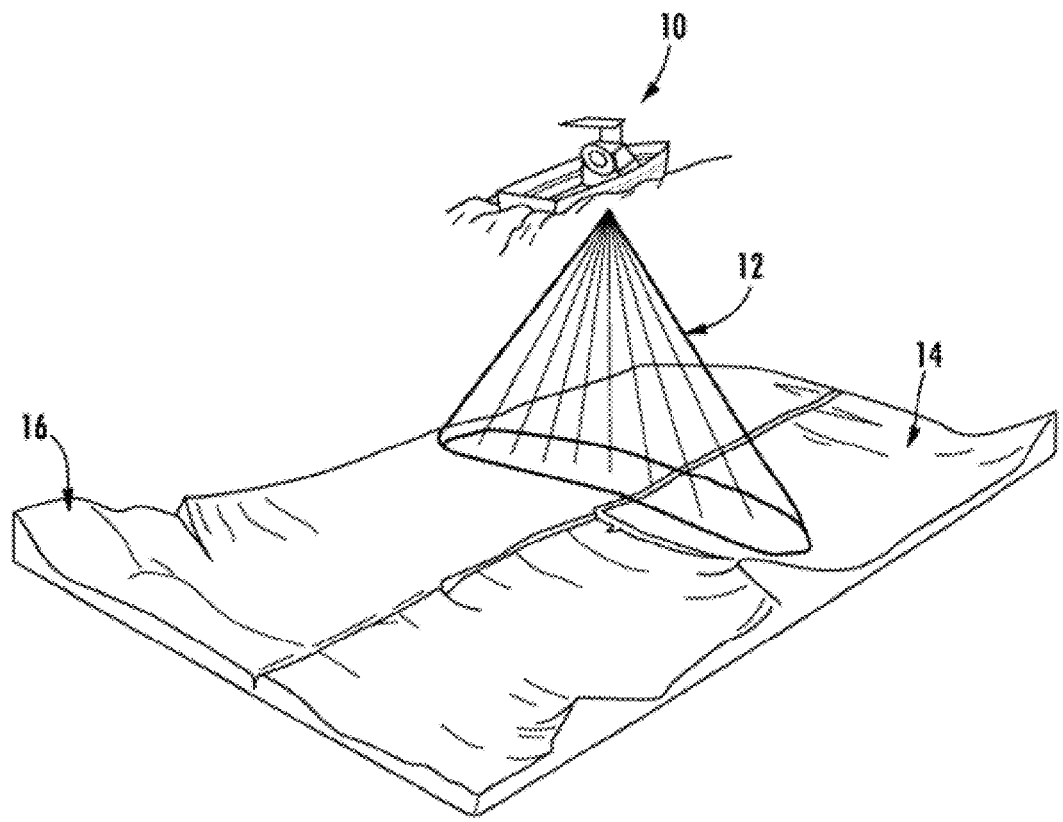
FIG. 1 is an illustration of an example sonar transducer emitting sonar pulses from a water craft.

Sonar systems, such as sonar depth finders, sidescan sonars, downscan sonars, and sonar fish finders, are commonly employed by boaters, sport fishermen, search and rescue personnel, researchers, surveyors, and others. With reference to FIG. 1, a water craft 10 may include a sonar system configured to create electrical pulses from a transceiver. A transducer then converts the electrical pulse into sound waves 12, which are sent into the water. In the depicted embodiment, a fan-shaped sound beam (e.g., a beam shape created from one or more rectangular transducers) is being transmitted into the water, however, as will be apparent to one of ordinary skill in the art in view of this disclosure, other sound beam configurations (e.g., conical shaped, elliptical shaped, multiple conical shaped, etc.) may be transmitted.

When the sound waves 12 strike anything of differing acoustic impedance (e.g., the sea floor or something suspended in the water above the bottom), the sound waves 12 reflect off that object. These echos or sonar returns may strike the transducer (or, in some cases, a separate receiver element), which converts the echos back into an electrical signal which is processed by a processor (e.g., sonar signal processor 32 shown in FIG. 2) and sent to a display (e.g., an LCD) mounted in the cabin or other convenient location in the water craft. This process is often called "sounding". Since the speed of sound in water is constant (approximately 4800 feet per second in fresh water), the time lapse between the transmitted signal and the received echos can be measured and the distance to the objects determined. This process repeats itself many times per second. The results of many soundings are used to build a picture on the display of the underwater world.

For example, the sound waves 12 may bounce off the floor 14 of the body of water and reflect back to the water craft, thereby indicating a depth of the water at that location. Sometimes, the floor 14 may have an uneven topography (e.g., a raised surface 16) that may reflect different depths of the water at different locations. In such a circumstance, the sound waves 12 reflect off the various floor surfaces and back to the water craft 10. If the raised surface 16 is closer to the water craft 10, the sound waves 12 will reach the water craft 10 faster and the sonar system will calculate that the depth is shallower at raised surface 16 than at surface 14. Additionally, objects on the floor (e.g., sunken logs, rocks, wreckage of ships, etc.) reflect the sonar beams and are detected as topographical features. Fish in the water also create their own characteristic sonar returns.

The active element in a transducer may comprise at least one man-made crystal (e.g., lead zirconate or barium titanate). A conductive coating is applied to sides of the crystal. Wires are soldered to these coatings so the crystal can be attached to a cable which transfers the electrical energy from the transmitter to the crystal. As an example, when the frequency of the electrical signal is the same as the mechanical resonant frequency of the crystal, the crystal moves, creating sound waves at that frequency. The shape of the crystal determines both its resonant frequency and shape and angle of the emanated sound beam. For round crystals, the thickness determines its frequency and the diameter determines the cone angle or angle of coverage. For example at 200 kHz, a 20 degree cone angle crystal is approximately one inch in diameter, whereas an eight degree cone requires a crystal that is about two inches in diameter. Sometimes it is desirable to have coverage which is wide in one direction (x axis) but narrow in the perpendicular direction (y axis). This fan shaped beam is usually produced by a rectangular element or an elliptical element (e.g., an element with an appropriate length to width ratio). Moreover, in some embodiments, more than one transducer may be used to create increased or enhanced sound wave coverage. Likewise, in some embodiments, more than one crystal may be used to create increased or enhanced sound wave coverage. Further information regarding creation of sound energy by differently shaped transducer elements may be found in the article "ITC Application Equations for Underwater Sound Transducers", which was published by International Transducer Corporation in 1995, Rev. 8/00, which is hereby incorporated by reference in its entirety.

Frequencies used by sonar devices vary but the most common ones range from 50 KHz to over 900 KHz depending on application. Some sonar systems vary the frequency within each sonar pulse using "chirp" technology. These frequencies are in the ultrasonic sound spectrum and are inaudible to humans.

As described herein, the sonar returns may be processed, such as by a sonar signal processor, to form sonar image data. Such sonar image data can be used to create an image of the underwater environment for which the sonar returns correspond. Some sonar systems may be designed such that, with reference to FIG. 1, sonar pulses (e.g., sound waves 12) may be emitted from the transducer assembly on the water craft 10 as it travels across the surface of the water. Such sounding may, depending on the arrangement and type of transducer elements being used, create sonar returns that are indicative of a horizontal "strip" of the underwater environment (e.g., the "strip" of the surface 24 shown within the sound waves 12). The sonar returns may be processed into sonar image data and presented consecutively on a display. Thus, as the water craft travels across the surface of the water, an image of the underwater environment will be created by the presentation of the consecutive strips. Such imaging is described further in U.S. patent application Ser. No. 13/313,574, entitled "Sonar Rendering Systems and Associated Methods," which is hereby incorporated by reference in its entirety and owned by the Applicant of the present application.

Such sonar systems, while useful for water crafts that are actively traveling along the surface of the water, may not be as useful for imaging an underwater environment under a water craft that is relatively stationary in the water (e.g., floating or anchored). Moreover, such sonar systems may require movement of the water craft in order to enable imaging of different sections of the underwater environment. This can be less than desirable in certain circumstances, such as when a user of the water craft is fishing.

As such, some embodiments of the present invention provide sonar systems that are configured to enable rotation of the transducer elements such that a 360 degree image of the underwater environment can be obtained. In some embodiments, the transducer assembly may be mounted to the water craft such that the transducer elements may be rotated to obtain a 360 degree image of the underwater environment. Alternatively, the transducer assembly may be mounted to a trolling motor, and the trolling motor can be rotated to obtain a 360 degree image of the underwater environment.

Additionally, some embodiments of the present invention provide a transducer assembly that enables imaging while the transducer assembly rotates at variable speeds. Indeed, in some embodiments, a transducer assembly may be designed such that it must pause in between transmission of sonar pulses and receipt of sonar returns. This dictates the rotation of the transducer assembly. Such a design, however, may be avoided in some embodiments of the present invention. Indeed, in some embodiments, the transducer assembly may be configured to collect sonar return data without having to pause during rotation (e.g., the transducer assembly may provide an image of the underwater environment even though it is continuously rotated). Such an embodiment may even allow for a user to define the speed of the rotation of the transducer assembly.

Figure 2:
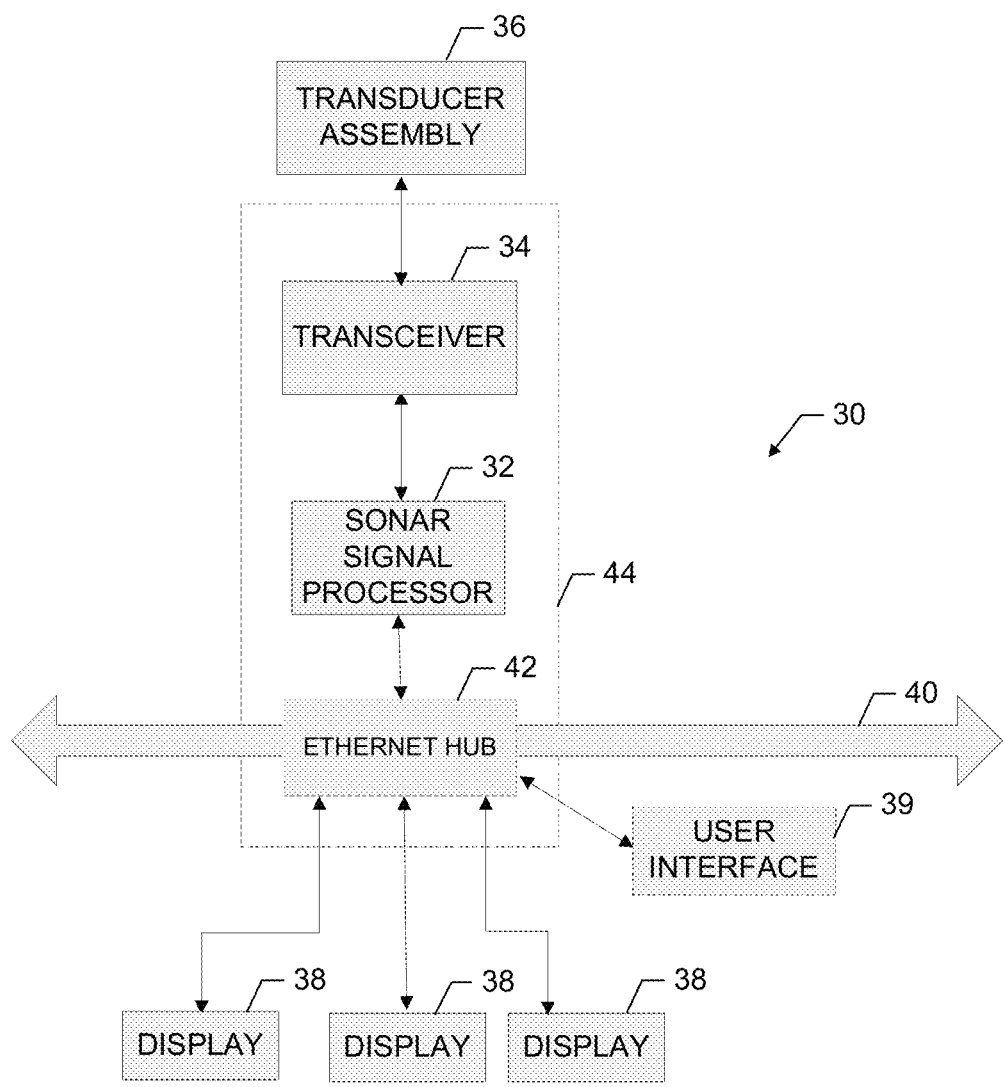
FIG. 2 is a basic block diagram illustrating a sonar system, in accordance with example embodiments described herein.

FIG. 2 is a basic block diagram illustrating a sonar system 30 capable for use with multiple example embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer assembly 36 and/or numerous other peripheral devices such as one or more multi-function displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks. The network may also support other data sources, including GPS, autopilot, engine data, compass, radar, etc.

The display 38 may be configured to display images and may include or otherwise be in communication with a user interface 39 configured to receive an input from a user. The display 38 may be, for example, a conventional LCD (liquid crystal display), a touch screen display, or any other suitable display known in the art upon which images may be rendered. Although each display 38 of FIG. 2 is shown as being connected to the sonar signal processor 32 via the network and/or via an Ethernet hub, the display 38 could alternatively be in direct communication with the sonar signal processor 32 in some embodiments, or the display 38, sonar signal processor 32 and user interface 39 could be in a single housing. The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

In an example embodiment, the sonar signal processor 32, the transceiver 34 and an Ethernet hub 42 or other network hub may form a sonar module 44. As such, for example, in some cases, the transducer assembly 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device driver accessible to the Ethernet hub 42 to enable the Ethernet hub 42 to properly work with displays for which the sonar module 44 is compatible. The sonar module 44 may also be enabled to be upgraded with additional device drivers or transceivers to enable expansion of the numbers and types of devices with which the sonar module 44 may be compatible. In some cases, the user may select a display type to check whether a display type is supported and, if the display type is not supported, contact a network entity to request software and/or drivers for enabling support of the corresponding display type.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system 30. For example, the sonar signal processor 32 may be configured to receive sonar return data and process the sonar return data to generate sonar image data for display to a user (e.g., on display 38).

In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with suitable memory, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer assembly 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include (or be in communication with) circuitry (e.g., transmitter circuitry 71 shown in FIG. 2A) for providing one or more transmission electrical signals to the transducer assembly 36 for conversion to sound pressure signals based on the provided electrical signals to be transmitted as a sonar pulse. The transceiver 34 may also include (or be in communication with) circuitry (e.g., receiver circuitry 72 shown in FIG. 2A) for receiving one or more electrical signals produced by the transducer assembly 36 responsive to sound pressure signals received at the transducer assembly 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns. In some embodiments, the transmitter circuitry 71 and/or receiver circuitry 72 may be positioned within the transceiver 34 or sonar module 44. In other embodiments the transmitter circuitry 71 and/or receiver circuitry 72 may be positioned within the transducer assembly 36. Likewise, in some embodiments, the transmitter circuitry 71 and/or receiver circuitry 72 may be positioned separate from the transducer assembly 36 and transceiver 34/sonar module 44.

The transducer assembly 36 according to an exemplary embodiment may be provided in one or more housings that provide for flexible mounting with respect to a hull of the water craft or trolling motor on which the sonar system 30 is employed. In this regard, for example, the housing may be mounted onto the hull of the water craft or onto a device or component that may be attached to the water craft (e.g., a trolling motor or other steerable device, or another component that is mountable relative to the hull of the water craft), including a bracket that is adjustable on multiple axes, permitting rotation of the housing and/or the transducer elements contained therein. Along these lines, in some embodiments, the housing is mountable to the water craft so as to enable 360 degree rotation of the transducer elements of the transducer assembly 36.

The transducer assembly 36 may include one or more transducer elements positioned within the housing, as described in greater detail below. In some embodiments, each of the transducer elements may be positioned within the housing so as to point toward a different volume under or to the side of the water craft. For example, some example transducer assemblies (e.g., shown in FIG. 3A, 4A, 7, or 8) are configured such that the transducer elements are oriented within the housing such that the transducer elements face generally outwardly and downwardly. Further, as will be described in greater detail herein, each transducer element within the transducer assembly may be mounted with respect to the other transducer elements such that the corresponding beam patterns insonify volumes with respect to each other.

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired.

In some embodiments, the transducer assembly 36 may comprise a combination of transducer elements that are configured to transmit sonar pulses and receive sonar returns and transducer elements that are configured to receive sonar returns only. For example, with reference to FIG. 2A, the transducer assembly 36 may comprise a first transducer element 66 that is configured to transmit-only and a second transducer element 62 that is configured to receive-only.

In some embodiments, the first transducer element 66 may be configured as a transmit-only transducer element. Such a transmit-only transducer element may be configured to transmit sonar pulses. For example, in the depicted embodiment of FIG. 2A, the transceiver 34 and/or sonar signal processor 32 may be configured to transfer a transmit signal to the first transducer element 66 to cause the first transducer element 66 to transmit sonar pulses. In some embodiments, the transmit signal may be transferred through transmitter circuitry 71.

Figure 2A:
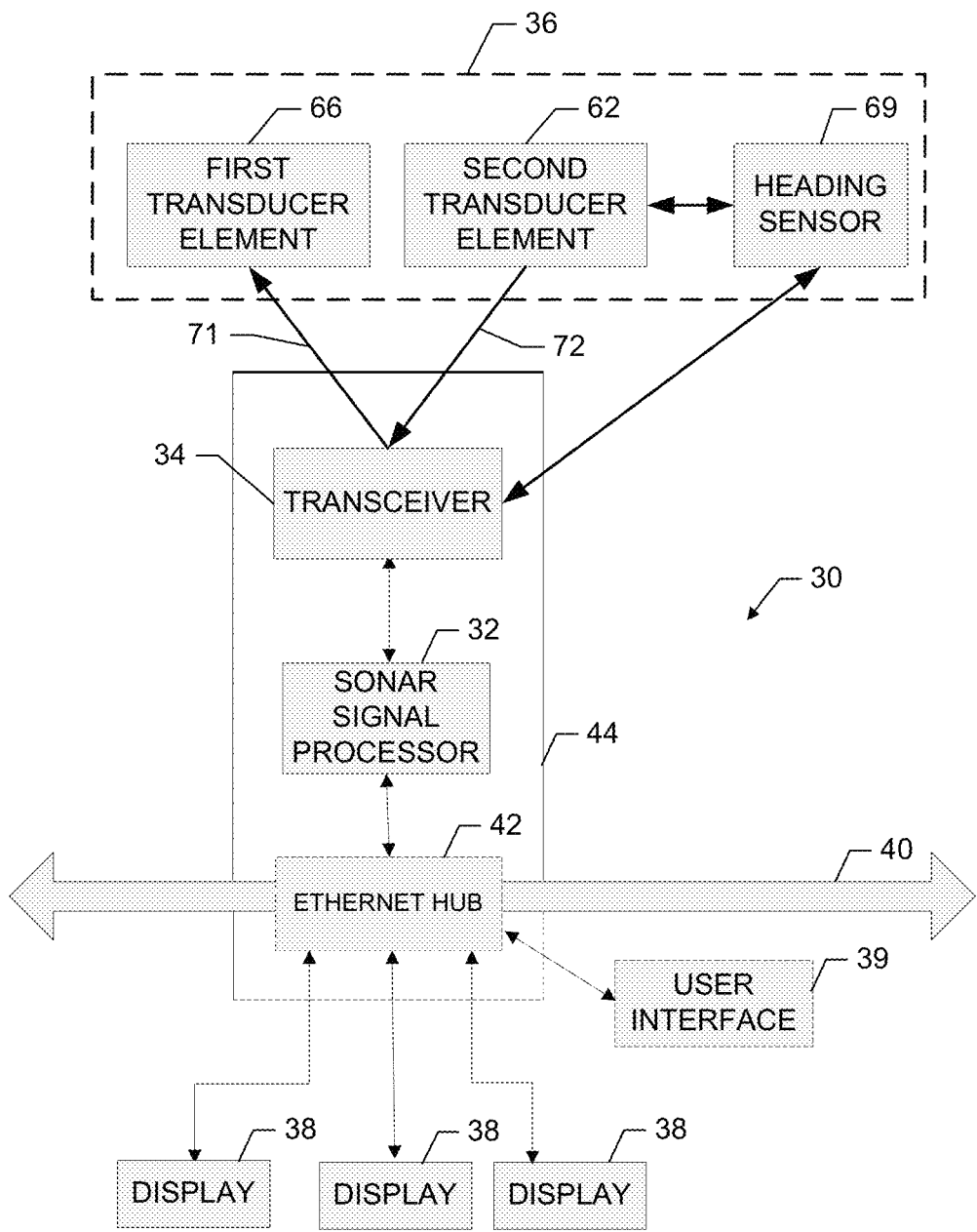
FIG. 2A is a basic block diagram illustrating another sonar system, in accordance with example embodiments described herein.

In some embodiments, the second transducer elements 62 may be configured as a receive-only transducer element. Such a receive-only transducer element may be configured to receive sonar returns without transmitting sonar pulses. In particular, the receive-only transducer element may be configured to receive sonar returns from sonar pulses (e.g., the sonar pulses transmitted by the first transducer element 66) and convert the sound energy of the sonar returns into sonar return data in the form of electrical signals representative of the sound energy. For example, in the depicted embodiment of FIG. 2A, the second transducer element 62 is configured to transfer sonar return data to the transceiver 34 and/or sonar signal processor 32 for processing and generation of sonar image data for display to a user (e.g., with display 38). In some embodiments, the sonar return data may be transferred to the transceiver/processor through receiver circuitry 72. Thus, in some embodiments, a receive-only transducer element may be in communication with the transceiver/processor through receiver circuitry 72 only and may not be in communication with the transceiver/processor through transmitter circuitry 71. A further example of a transducer assembly consistent with the transducer assembly 36 shown in FIG. 2A is shown and described with respect to FIG. 3A.

In other embodiments, the transducer assembly 36 may comprise any combination or any number of transducer elements configured to transmit sonar pulses and/or receive sonar returns (e.g., 2 receive-only and 1 transmit-only transducer elements, 2 transmit-only and 2 respective receive-only transducer elements, etc.). Along these lines, in some embodiments, one or more transducer elements may be configured as a transmit/receive transducer element such that it may be configured to transmit sonar pulses and receive sonar returns. In such a regard, the transmit/receive transducer element may be in communication with the transceiver/process through both transmitter circuitry 71 and receiver circuitry 72.

In some embodiments, the transducer assembly 36 may comprise (or be in communication with) a heading sensor 69. In some embodiments, the heading sensor 69 may be configured to detect the heading of the at least one transducer element (e.g., the second transducer element 62). Additionally, the heading sensor 69 may be in communication with the transceiver/processor and may provide the detected heading to the transceiver 34 and/or processor 32. In such an embodiment, as will be described in greater detail herein, the detected heading may be associated with specific sonar return data that may be transmitted to the transceiver/processor from the second transducer element 62 (e.g., through receiver circuitry 72).

In some embodiments, each transducer element may comprise any shape. The shape of a transducer element largely determines the type of beam that is formed when that transducer element transmits a sonar pulse (e.g., a circular transducer element emits a cone-shaped beam, a linear transducer emits a fan-shaped beam, etc.). In some embodiments, a transducer element may comprise one or more transducer elements positioned to form one transducer element. For example, a linear transducer element may comprise two or more rectangular transducer elements aligned with each other so as to be collinear. In some embodiments, three transducer elements aligned in a collinear fashion (e.g., end to end) may define one linear transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Indeed, while depicted and described embodiments generally detail a square or linear transducer element made of piezoelectric material, other shapes and types of material are applicable to embodiments of the present invention.

In some embodiments, each transducer element may be configured to operate at any frequency, including operation over an array of frequencies. Along these lines, it should be understood that many different operating ranges could be provided with corresponding different transducer element sizes and shapes (and corresponding different beamwidth characteristics). Moreover, in some cases, the sonar module 44 may include a variable frequency selector, to enable an operator to select a particular frequency of choice for the current operating conditions.

In some embodiments, the transducer element may define a linear transducer element, which may be configured to transmit sonar pulses and/or receive sonar returns within a volume defined by a fan-shaped beam. Such a fan-shaped beam may have a wide beamwidth in a direction substantially perpendicular to the longitudinal length of the transducer element and a narrow beamwidth in a direction substantially parallel to the longitudinal length of the transducer element.

Additionally, in some embodiments, the liner transducer element may be configured to operate in accordance with at least two operating frequencies. In this regard, for example, a frequency selection capability may be provided by the sonar module 44 to enable the user to select one of at least two frequencies of operation. In one example, one operating frequency may be set to about 800 kHz and another operating frequency may be set to about 455 kHz. Furthermore, the length of the transducer elements may be set to about 60 mm each (or, in some cases, as noted herein, 180 mm with 3 transducer elements aligned in longitudinal sequence) while the width is set to about 3 mm to thereby produce beam characteristics corresponding to a fan of about 1.5 degrees by about 32 degrees at 800 kHz or about 3.5 degrees by about 56 degrees at 455 kHz. For example, when operating at 455 kHz, the length and width of the transducer elements 60 may be such that the beamwidth of sonar beam produced by the transducer elements 60 in a direction parallel to a longitudinal length (L) of the transducer elements 60 is less than about five percent as large as the beamwidth of the sonar beam in a direction (w) perpendicular to the longitudinal length of the transducer elements 60. As such, in some embodiments, any length and width for a transducer element may be used. Lengths longer than 8 inches may be appropriate at operating frequencies lower than those indicated above, and lengths shorter than 8 inches may be appropriate at frequencies higher than those indicated above.

It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped and sharply defined boundaries, those boundaries merely correspond to the −3 dB (or half power) points for the transmitted beams. In other words, energy measured outside of the boundaries shown is less than half of the energy transmitted, but this sound energy is present nonetheless. Thus, some of the boundaries shown are merely theoretical half power point boundaries.

In some embodiments, the transducer element may define a square transducer element, which may be configured to transmit sonar pulses or receive sonar returns within a volume defined by a square-shaped beam. Such a square-shaped beam may have a wide beamwidth in a direction substantially perpendicular and a direction substantially parallel to the length of the transducer element.

Though the above-described embodiments detail a linear transducer element and a square transducer element, some embodiments of the presented invention contemplate any shaped transducer element and transmission of sonar pulses or receipt of sonar returns within a volume defined by any shaped beam.

As noted above, some embodiments of the present invention provide a sonar transducer assembly configured for 360 degree imaging of an underwater environment under a water craft. FIGS. 3A, 3B, and 3C illustrate an example sonar transducer assembly 136 mounted to a trolling motor 120 of a water craft 100.

In some embodiments, the sonar transducer assembly may include at least one transmit-only transducer element positioned within a housing and aimed outwardly and downwardly. The transmit-only transducer element may be configured to transmit sonar pulses to insonify a first volume. For example, with reference to FIGS. 3A and 3B, the transducer assembly 136 includes a transmit-only transducer element that is aimed outwardly (shown in FIG. 3A) and downwardly (shown in FIG. 3B) and configured to transmit sonar pulses to insonify a first volume 140.

In some embodiments, the first volume may be defined by a square-shaped beam. The square-shaped beam may be defined by a relatively wide beamwidth in a first plane (e.g., the direction substantially parallel to the surface of the water) and a second plane perpendicular to the first plane (e.g., the direction substantially perpendicular to the surface of the water). For example, with reference to FIG. 3A, the first volume 140 defines a relatively wide beamwidth (e.g., 30 degrees) in the direction substantially parallel to the surface of the water 110 (e.g., a horizontal beamwidth). Additionally, with reference to FIG. 3B, the first volume 140 defines a relatively wide beamwidth (e.g., 30 degrees) in the direction substantially perpendicular to the surface of the water 110 (e.g., a vertical beamwidth). In such a manner, the first volume may define a wide volume for transmission of sonar pulses.

In some embodiments, the sonar transducer assembly may include at least one receive-only transducer element positioned within a housing and aimed outwardly and downwardly. The receive-only transducer element may be configured to receive sonar returns from the sonar pulses within a second volume. In some embodiments, the second volume may define a fan-shaped beam such that the fan-shaped beam is defined by a relatively narrow beamwidth in the first plane (e.g., the direction substantially parallel to the surface of the water) and a relatively wide beamwidth in the second plane that is perpendicular to the first plane (e.g., the direction substantially perpendicular to the surface of the water). In some embodiments, the second volume may be smaller than the first volume and the receive-only transducer may be aimed within the housing such that the second volume is wholly contained within the first volume. For example, with reference to FIGS. 3A and 3B, the transducer assembly 136 includes a receive-only transducer element that is aimed outwardly (shown in FIG. 3A) and downwardly (not shown, but generally consistent with the beam pattern of the first volume 140 in the direction perpendicular to the surface of the water, as shown in FIG. 3B) and configured to receive sonar returns within a second volume 150. The second volume 150 defines a relatively narrow beamwidth (e.g., 2 degrees) in the direction substantially parallel to the surface of the water 110 (e.g., a horizontal beamwidth). Additionally, the second volume 150 defines a relatively wide beamwidth (e.g., 30 degrees) in the direction substantially perpendicular to the surface of the water 110 (e.g., a vertical beamwidth). The second volume 150 is smaller than the first volume 140 and wholly contained within the first volume 140. In such a manner, the smaller second volume 150 may receive concentrated sonar returns focused on a smaller volume to provide a higher quality image.

As noted above, in some embodiments, the sonar transducer assembly may comprise a housing that is mountable to a water craft so as to enable 360 degree rotation of the transducer elements with respect to the water craft. With reference to FIGS. 3A, 3B, and 3C, the transducer assembly 136 may be mounted to a trolling motor 120 such that the transducer assembly 126 (and the transducer elements contained therein) may be rotated 360 degrees with respect to the water craft 100 along with the trolling motor 120. For example, with reference to FIG. 3A, the transducer assembly 136 and the trolling motor 120 may be aimed to transmit sonar pulses (e.g., defined by the first volume 140) and receive sonar returns (e.g., defined by the second volume 150) generally forward from the water craft 100. However, with reference to FIG. 3C, the sonar transducer assembly 136 may be rotated (e.g., along arrow A) such that the transducer assembly 136 is aimed to transmit sonar pulses (e.g., defined by the first volume 140') and receive sonar returns (e.g., defined by the second volume 150') generally 45 degrees clockwise from forward of the water craft 100. This rotation may continue such that the transducer assembly 136 may transmit sonar pulses and receive sonar returns from any angle with respect to forward from the water craft (e.g., the transducer assembly 136 may rotate 360 degrees).

Though the above described embodiment details a sonar transducer assembly mounted to a trolling motor to enable 360 degree rotation, some embodiments of the present invention contemplate other ways to enable 360 degree rotation of the transducer elements. For example, with reference to FIGS. 4A, 4B, and 4C, another example sonar transducer assembly 125 is also configured to enable 360 degree rotation of the transducer elements with respect to the water craft 100. However, the transducer assembly 125 is mounted to the water craft 100 and configured to independently rotate the transducer elements with respect to the water craft 100. Such rotation may be achieved by any means (e.g., a motor, manually, etc.). For example, with reference to FIG. 4A, the transducer assembly 125 may be aimed to transmit sonar pulses (e.g., defined by the first volume 140) and receive sonar returns (e.g., defined by the second volume 150) generally 45 degrees counterclockwise from backward of the water craft 100. However, with reference to FIG. 4C, the sonar transducer assembly 125 may be rotated (e.g., along arrow B) such that the transducer assembly 125 is aimed to transmit sonar pulses (e.g., defined by the first volume 140') and receive sonar returns (e.g., defined by the second volume 150') generally 60 degrees counterclockwise from backward of the water craft 100. This rotation may continue such that the transducer assembly 125 may transmit sonar pulses and receive sonar returns from any angle with respect to forward from the water craft (e.g., the transducer assembly 125 may rotate 360 degrees).

Along these lines, similar to the transducer assembly 136 of FIGS. 3A, 3B, and 3C, the transducer assembly 125 of FIGS. 4A, 4B, and 4C, may include a transmit-only transducer element aimed outwardly (shown in FIG. 4A) and downwardly (shown in FIG. 4B) and configured to transmit sonar pulses to insonify a first volume 140. The first volume 140 defines a relatively wide beamwidth in the direction substantially parallel to the surface of the water 110 (shown in FIG. 4A) and a relatively wide beamwidth in the direction substantially perpendicular to the surface of the water 110 (shown in FIG. 4B). The transducer assembly 125 also includes a receive-only transducer element that is aimed outwardly (shown in FIG. 4A) and downwardly (not shown, but generally consistent with the beam pattern of the first volume 140 in the direction perpendicular to the surface of the water, as shown in FIG. 4B) and configured to receive sonar returns within a second volume 150. The second volume 150 defines a relatively narrow beamwidth in the direction substantially parallel to the surface of the water 110 (shown in FIG. 4A) and a relatively wide beamwidth in the direction substantially perpendicular to the surface of the water 110. In such a manner, the second volume 150 is smaller than the first volume 140 and wholly contained within the first volume 140.

Additionally, as noted above, some embodiments of the present invention provide a transducer assembly that enables imaging while the transducer assembly rotates at variable speeds. Said differently, in some embodiments, the at least one receive-only transducer element is configured to receive sonar returns from sonar pulses of the at least one transmit-only transducer element while the at least one transmit-only transducer element and receive-only transducer element are rotated at variable speeds. Further, in some embodiments, the sonar transducer assembly may provide imaging while being rotated continuously (e.g., without pauses). In such embodiments, the at least one receive-only transducer element is configured to receive sonar returns from sonar pulses of the at least one transmit-only transducer element without the need to pause rotation of the at least one transmit-only transducer element and receive-only transducer element. Moreover, in some embodiments, the transducer assembly may provide imaging while being rotated at a user-defined speed. Thus, in such embodiments, the at least one receive-only transducer element is configured to receive sonar returns from sonar pulses of the at least one transmit-only transducer element while the at least one transmit-only transducer element and receive-only transducer element are rotated at a user-defined speed.

Such advantages are not recognized by use of a traditional transducer assembly. However, the configuration of some example transducer assemblies enables realization of these advantages. For example, in some embodiments, the transducer assembly comprises a transmit-only transducer element that transmits sonar pulses in a wide first volume (e.g., the 30 degrees shown in FIG. 3A) and a receive-only transducer element that receives sonar returns in a small second volume (e.g., the 2 degrees shown in FIG. 3A). Moreover, the receive-only transducer element is aimed such that the second volume is wholly contained within the first volume (e.g., the second volume 150 is centered within the first volume 140). Thus, as the transducer assembly rotates, the sonar pulses are available in a wide degree arc, but the sonar returns are only needed in a small degree arc.

Said differently, due to the time delay of sound and the unknown rotational speed of the transducer assembly, it is difficult to predict where the sonar pulses need to be for the receive-only transducer element to capture adequate sonar returns. Thus, the depicted embodiment of FIG. 3A enables an additional 14 degrees of sonar pulses on either side of the second volume for where the sonar returns are captured. The additional 14 degrees account for the time delay of sound and the unknown rotational speed of the transducer assembly. In such a regard, even though the transducer assembly may be actively rotating, the receive-only transducer element may receive sonar returns with adequate detail to produce an image. Indeed, with the second volume being centered within the first volume, the transducer assembly may be rotated in either direction.

Though the above described embodiments detail additional 14 degrees of sonar pulses on either side of the second volume for where the sonar returns are captured, some embodiments contemplate other configurations. Indeed, the second volume may be positioned differently with respect to the first volume. Further, as noted above, in some embodiments, the first volume may be defined by different beam characteristics (e.g., 45 degrees, 60 degrees, etc.). Similarly, the second volume may be defined by different characteristics (e.g., 1 degree, 5 degrees, 15 degrees, etc.). Moreover, as will be described in greater detail herein, some configurations of example transducer assemblies may include more than one transmit-only transducer element and/or receive-only transducer element.

As noted above, some embodiments of the present invention comprise a sonar signal processor. In some embodiments, the sonar signal processor is configured to receive sonar return data resulting from the at least one receive-only transducer element and process the sonar return data to produce sonar image data for the corresponding second volume (e.g., the second volume from which the sonar return data originated).

In some embodiments, the sonar signal processor is further configured to create an image of the underwater environment. Along these lines, in some embodiments, the sonar signal processor is configured to create an image of the underwater environment as a composite of sonar images derived from sonar image data of the second volumes respectively arranged in positions corresponding to the rotation of the sonar transducer assembly. As the sonar transducer assembly rotates, the receive-only transducer element will capture sonar returns from various different second volumes. These sonar returns are processed and formed into sonar images by the sonar signal processor. Then, the sonar signal processor can create an image of the underwater environment by arranging the sonar images in the proper order that corresponds with the position and heading of the receive-only transducer element when receiving the sonar returns (as defined by the respective second volume).

Along these lines, in some embodiments, the sonar transducer assembly may comprise a heading sensor configured to detect the heading of the at least one receive-only transducer element. The detected heading may be associated with sonar returns for the respective second volume. Further, the detected heading may be transmitted to the sonar signal processor for aiding in arranging of the sonar images of each second volume. For example, each sonar image may have an associated heading that enables the sonar signal processor to determine its arrangement to create the image of the underwater environment. Further, in some embodiments, the sonar signal processor may take into account the relative heading of the water craft as compared to the heading of the associated sonar returns when creating the image.

Figure 5:
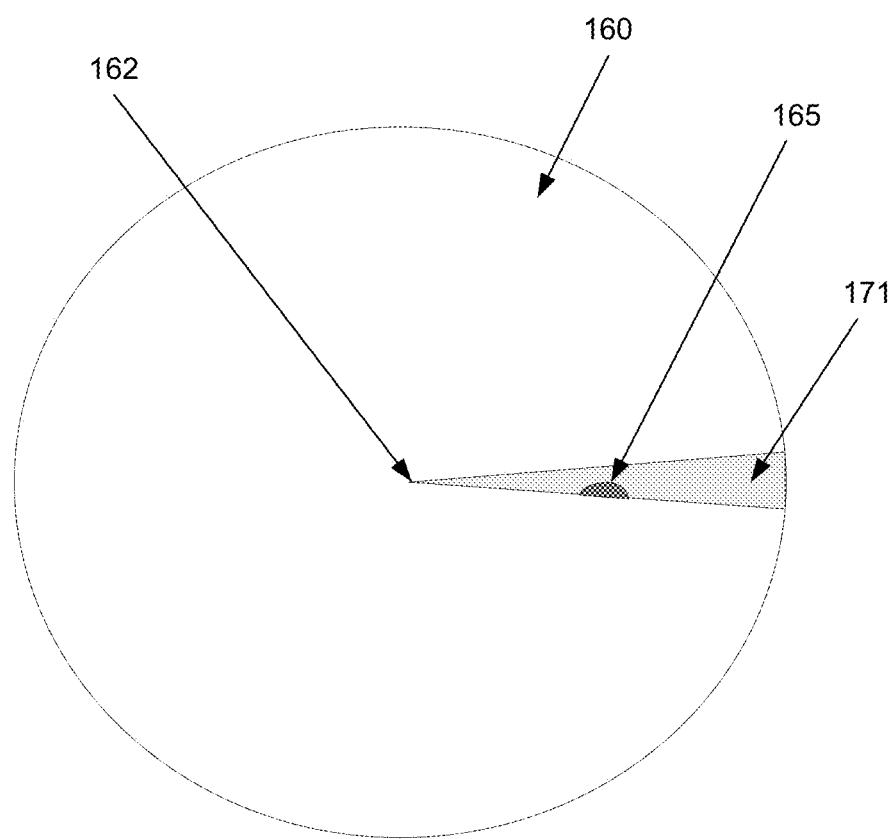
FIG. 5 is a diagram illustrating an example image of an underwater environment, wherein a sonar image indicative of sonar returns from a first volume of the underwater environment is being displayed, in accordance with example embodiments described herein.

FIG. 5 shows a diagram illustrating an example display of an underwater environment. The transducer assembly may be positioned at 162 and aimed such that the receive-only transducer element received sonar returns in a heading associated with a first volume 171. The sonar signal processor may process the sonar returns associated with the first volume 171 and, using the heading, position the sonar image of the first volume 171 on a map of the underwater environment 160. The sonar image of first volume 171 may include a portion of an object 165.

Figure 5A:
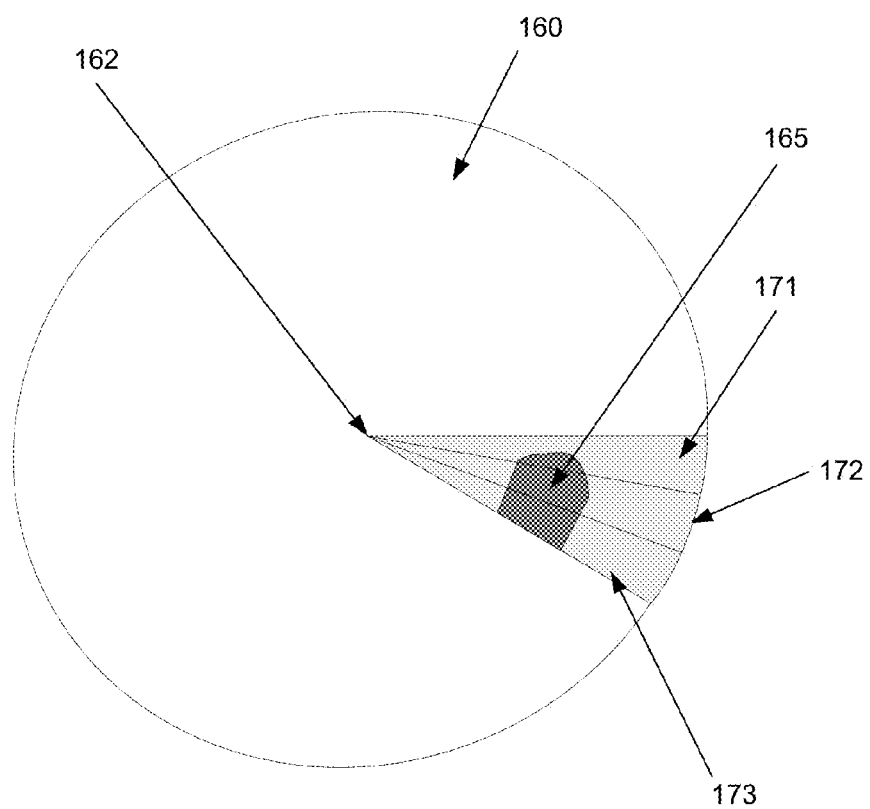
FIG. 5A is a diagram illustrating the display of the underwater environment in FIG. 5, wherein three consecutive sonar images, each being indicative of a different volume of the underwater environment, are being displayed, in accordance with example embodiments described herein.

With reference to FIG. 5A, as the transducer assembly rotates clockwise, additional sonar images may be arranged on the map of the underwater environment 160. In the depicted embodiment, the receive-only transducer element may have rotated slightly clockwise to capture sonar returns within a second volume 172. Further, the receive-only transducer element may have rotated slightly clockwise again to capture sonar returns within a third volume 173. The sonar signal processor may process the sonar returns associated with second and third volumes 172 and 173 and, using the respective headings, position the sonar images of the volumes 172 and 173 on the map of the underwater environment 160 to further define the image. As shown in FIG. 5A, further detail of the object 165 can be seen with the addition of the sonar images from second and third volumes 172 and 173. In such a regard, as the transducer assembly rotates, the image of the underwater environment can be further defined (e.g., until it is complete).

Figure 6:
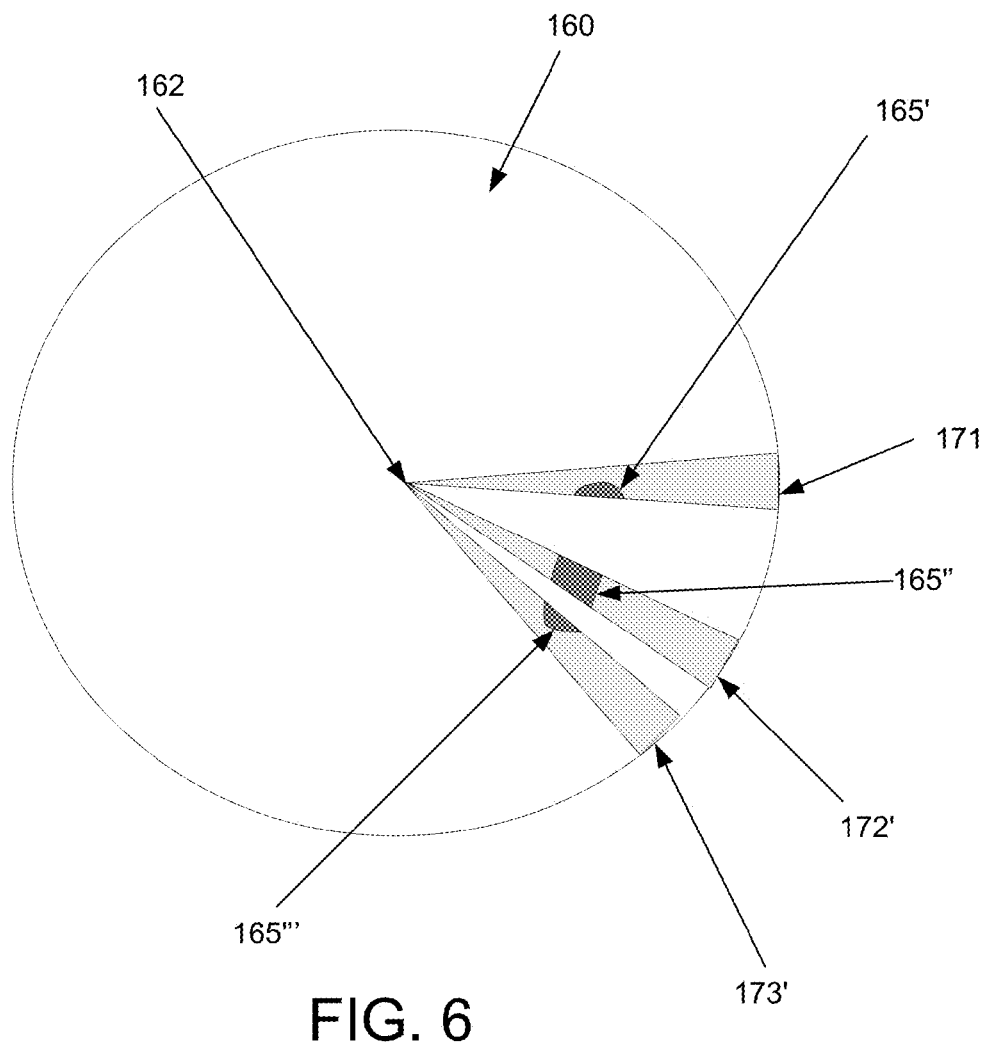
FIG. 6 is a diagram illustrating the display of the underwater environment in FIG. 5, wherein three sonar images, each being indicative of a different volume of the underwater environment, are being displayed, in accordance with example embodiments described herein.
Figure 7:
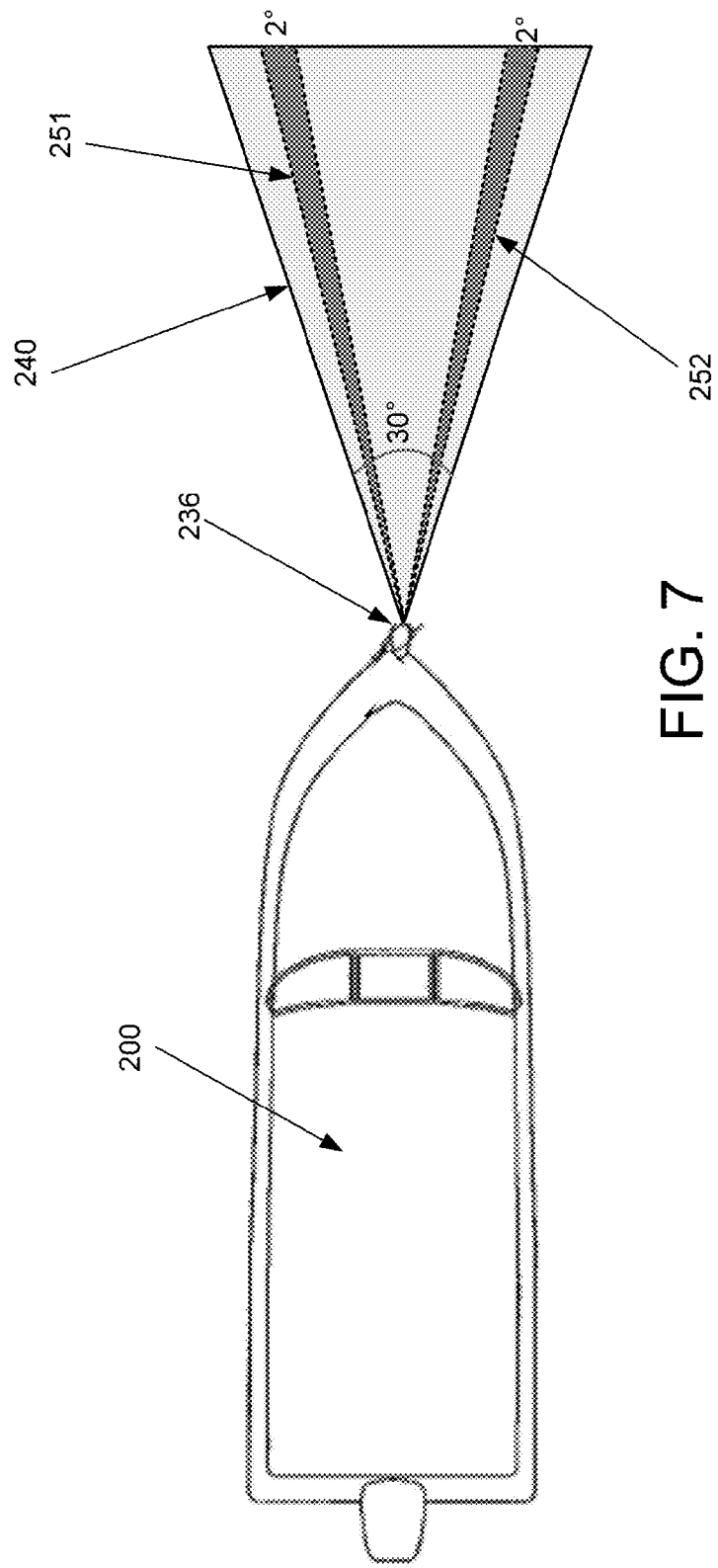
FIG. 7 illustrates a top view of a water craft and another example sonar transducer assembly attached to a trolling motor of the watercraft, wherein the transducer assembly is shown emitting an example beam pattern that is defined by a transmit-only transducer element and two receive-only transducer elements, in accordance with example embodiments described herein.

As noted above, some embodiments of the present invention seek to provide a transducer assembly that enables imaging while the transducer assembly rotates at variable speeds. In such a regard, as is consistent with the above disclosure, the receive-only transducer element may capture sonar returns from volumes that are not consecutively positioned. For example, the speed at which the transducer assembly is rotating may cause gaps to occur between the sonar returns. The sonar signal processor, in some embodiments, may be configured to account for such gaps when creating the image of the underwater environment. Indeed, use of the detected heading associated with the sonar returns may aid in proper arrangement of each sonar image of each respective volume. For example, FIG. 6 illustrates an image of the same underwater environment 160 shown in FIG. 5A. However, the transducer assembly has rotated at variable speeds such that the sonar images of the second and third volumes 172' and 173' are different than that of the second and third volumes 172 and 173 shown in FIG. 5A. In this regard, the sonar signal processor has accounted for the variable speed of rotation by properly arranging the sonar images of the second and third volumes 172' and 173' on the map of the underwater environment 160 using their respective headings. For example, in the depicted embodiment, the object 165 is shown in pieces of 165' and 165" in volumes 172' and 173' respectively.

In some embodiments, the sonar signal processor is configured to process sonar returns to produce three-dimensional sonar image data. Additionally, in some embodiments, the sonar signal processor is configured to create a three-dimensional image of the underwater environment based on the three-dimensional sonar image data. For example, the direction at which the transducer elements in some example transducer assemblies aim may enable three-dimensional scanning (e.g., the transducer elements may be forward looking). Thus, in some embodiments, creation of three-dimensional imaging is possible. As such, some embodiments of the present invention contemplate three-dimensional scanning and imaging for presentation to the user.

As noted above, some embodiments of the present invention contemplate transducer assemblies with different configurations of transmit-only elements and/or receive-only elements. For example, in some embodiments, the at least one receive-only element may comprise a second receive-only transducer element. The second receive-only transducer element may be positioned within the housing and aimed outwardly and downwardly and configured to receive sonar returns from the sonar pulses within a third volume defined by a second fan-shaped beam. The second fan-shaped beam may be defined by a relatively narrow beamwidth in the direction substantially parallel to the surface of the water and a relatively wide beamwidth in the direction substantially perpendicular to the surface of the water. The third volume may be smaller than the first volume and the second receive-only transducer element may be aimed within the housing such that the third volume is different than the second volume and wholly contained within the first volume. In such a regard, the transducer element may include one transmit-only transducer element and two corresponding receive-only transducer elements. For example, with reference to FIG. 7, the transducer assembly 236 may include a transmit-only transducer element aimed outwardly and downwardly and configured to transmit sonar pulses to insonify a first volume 240. The first volume 240 defines a relatively wide beamwidth in the direction substantially parallel to the surface of the water and a relatively wide beamwidth in the direction substantially perpendicular to the surface of the water. The transducer assembly 236 also includes a first receive-only transducer element that is aimed outwardly and downwardly and configured to receive sonar returns within a second volume 251. The transducer assembly 236 further includes a second receive-only transducer element that is aimed outwardly and downwardly and configured to receive sonar returns within a third volume 252. The second volume 251 and the third volume 252 each define a relatively narrow beamwidth in the direction substantially parallel to the surface of the water and a relatively wide beamwidth in the direction substantially perpendicular to the surface of the water. In such a manner, the second volume 251 and the third volume 252 are each smaller than the first volume 240 and wholly contained within the first volume 240. In the depicted embodiment of FIG. 7, the second volume 251 is spaced apart from the third volume 252 but still contained within the first volume 240.

Further, in such an embodiment, a heading sensor may be dedicated to each receive-only transducer element. Along these lines, the sonar signal processor may be configured to arrange the sonar images corresponding to each receive-only transducer element properly to form an image of the underwater environment. For example, when forming the image, a volume may be arranged for each receipt of sonar returns (e.g., two volumes for the two receive-only transducer elements). Each volume may be arranged according to its individual corresponding heading.

As noted above, the first volume, second volume, and/or third volume may each define any beam characteristic and may be positioned in any manner with respect to each other. For example, in some embodiments, the receive-only transducer elements may be aimed in the housing such that the second volume and third volume are each approximately 10 degrees on either side of the centerline of the first volume. Alternatively, in some embodiments, the receive-only transducer elements may be aimed in the housing such that the second volume and third volume are adjacent.

Along the lines noted above, another example configuration of a sonar transducer assembly, which is illustrated in FIG. 8, may include a second transmit-only transducer element and corresponding second receive-only transducer element. This second set of the second transmit-only transducer element and corresponding second receive-only transducer element may be aimed within the housing differently than the first set of the first transmit-only transducer element and corresponding first receive-only transducer element. In such a manner, an even broader range of coverage may be achieved by the transducer assembly. With reference to FIG. 8, the transducer assembly 336 may include a first transmit-only transducer element aimed outwardly and downwardly and configured to transmit sonar pulses to insonify a first volume 341. The first volume 341 defines a relatively wide beamwidth in the direction substantially parallel to the surface of the water and a relatively wide beamwidth in the direction substantially perpendicular to the surface of the water. The transducer assembly 336 also includes a first receive-only transducer element that is aimed outwardly and downwardly and configured to receive sonar returns within a second volume 351. The transducer assembly 336 further includes a second transmit-only transducer element aimed outwardly and downwardly and configured to transmit sonar pulses to insonify a third volume 342 and a second receive-only transducer element that is aimed outwardly and downwardly and configured to receive sonar returns within a fourth volume 352. The second volume 351 and the fourth volume 352 each define a relatively narrow beamwidth in the direction substantially parallel to the surface of the water and a relatively wide beamwidth in the direction substantially perpendicular to the surface of the water. Further, the second volume 351 is smaller than the first volume 341 and wholly contained within the first volume 341. Likewise, the fourth volume 352 is smaller than the third volume 342 and wholly contained within the third volume 342. In the depicted embodiment of FIG. 8, the first volume 341 is spaced apart from the third volume 342 to provide sonar pulses in an even greater coverage volume. As noted above, the first volume, second volume, third volume, and/or fourth volume may each define any beam characteristic and may be positioned in any manner with respect to each other.

Further, in such an embodiment, a heading sensor may be dedicated to each receive-only transducer element. Along these lines, the sonar signal processor may be configured to arrange the sonar images corresponding to each receive-only transducer element properly to form an image of the underwater environment. For example, when forming the image, a volume may be arranged for each receipt of sonar returns (e.g., two volumes for the two receive-only transducer elements). Each volume may be arranged according to its individual corresponding heading.

In some embodiments, the transducer assembly may be configured to incorporate a phased array receive element. For example, in some embodiments, the receive-only transducer element may comprise a phased array receiver. The phased array receiver may be configured to beam-form multiple closely spaced beam patterns to receive sonar returns. Each beam may receive separate sonar returns and transmit those sonar returns to the sonar signal processor for processing. For example, the phased array receiver may be capable of beam-forming three 1 degree beam patterns spaced closely together. In such an embodiment, the coverage area of the phased array receiver would provide a small physical size (e.g., an advantage for mounting purposes), but enable greater coverage area (e.g., 3 degrees of sonar returns). In such an embodiment, three separate receive channels may be used to transmit the sonar returns to the sonar signal processor. Alternatively, in some embodiments, a frequency scanned phased array may be used to receive the sonar returns. As such, one channel may be used to transmit the sonar returns to the sonar signal processor.

FIG. 9 illustrates a flowchart according to an example method for operating a transducer assembly according to an example embodiment 400. Operations that are shown in dashed lines need to necessarily be performed for embodiments of the present invention. Some of the operations illustrated in and described with respect to FIG. 9 may, for example, be performed by, with the assistance of, and/or under the control of one or more of the processor 32 or transceiver 34. Operation 402 may comprise transferring a transmit signal to cause a transmit-only transducer element to transmit the sonar pulses. The processor 32, transceiver 34, or transmitter circuitry 71 may, for example, provide means for performing operation 402. Operation 404 may comprise transmitting sonar pulses from the transmit-only transducer element.

Operation 406 may comprise receiving sonar returns from the sonar pulses with the receive-only transducer element and converting the sonar returns into sonar return data. Operation 408 may comprise transferring the sonar return data indicative of the sonar returns to the processor. The transceiver 34 or receiver circuitry 72 may, for example, provide means for performing operation 408.

Operation 410 may comprise processing the sonar return data. The processor 32 may, for example, provide means for performing operation 410. Operation 412 may comprise creating an image of the underwater environment as a composite of sonar images derived from the sonar image data respectively arranged in positions corresponding to the rotation of the transmit-only transducer and the receive-only transducer. The processor 32 may, for example, provide means for performing operation 412.

Operation 414 may comprise displaying the image of the underwater environment. The processor 32, user interface 39, or display 38 may, for example, provide means for performing operation 414.

Though the described embodiment of FIG. 9 details operating one example transducer assembly, some embodiments of the present invention contemplate methods for operating any example transducer assembly described herein.

In some embodiments, a method of manufacturing any example transducer assembly (or sonar system) described herein. For example, in some embodiments, a method for assembling a sonar transducer system for a water craft capable of traversing a surface of a body of water is provided. The method includes providing a housing mountable to a water craft so as to enable 360 degree rotation of at least one transmit-only transducer element and at least one receive-only transducer element. The method further includes mounting the at least one transmit-only transducer element within the housing to aim outwardly and downwardly. The at least one transmit-only transducer element may be configured to transmit sonar pulses to insonify a first volume. The method further includes mounting the at least one receive-only transducer element within the housing to aim outwardly and downwardly. The housing is mountable to the water craft so as to enable 360 degree rotation of the at least one transmit-only transducer element and the at least one receive-only transducer element with respect to the water craft. The at least one receive-only transducer element may be configured to receive sonar returns from the sonar pulses within a second volume defined by a fan-shaped beam. The fan-shaped beam may be defined by a relatively narrow beamwidth in a direction substantially parallel to the surface of the water and a relatively wide beamwidth in a direction substantially perpendicular to the surface of the water. The second volume may be smaller than the first volume and the at least one receive-only transducer element may be aimed within the housing such that the second volume is wholly contained within the first volume. The at least one receive-only transducer element may be further configured to convert sound energy of the sonar returns into sonar return data.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sonar transducer assembly for a water craft, the sonar transducer assembly comprising:
at least one transmit-only transducer element positioned within a housing and aimed outwardly and downwardly, wherein the at least one transmit-only transducer element is configured to transmit sonar pulses within a transmit beam to insonify a first volume;
at least one receive-only transducer element positioned within the housing and aimed outwardly and downwardly, wherein the at least one receive-only transducer element is configured to receive sonar returns from the sonar pulses within a second volume defined by a fan-shaped beam, wherein the fan-shaped beam is defined by a relatively narrow beamwidth in a first plane and a relatively wide beamwidth in a second plane that is perpendicular to the first plane, wherein the second volume is smaller than the first volume, wherein the at least one receive-only transducer element is aimed within the housing such that the second volume is wholly contained within the first volume such that a first portion of the transmit beam defining the first volume extends beyond one side of the fan-shaped beam defining the second volume in the first plane and a second portion of the transmit beam defining the first volume extends beyond another side of the fan-shaped beam defining the second volume in the first plane;

wherein the at least one transmit-only transducer element is distinct from the at least one receive-only transducer element; and wherein the housing is mountable to the water craft so as to enable rotation of the at least one transmit-only transducer element and the at least one receive-only transducer element with respect to the water craft within a rotation plane, wherein the at least one transmit-only transducer element and the at least one receive-only transducer element are aimed within the housing in a fixed direction with respect to each other so as to rotate together such that the first portion and the second portion of the transmit beam extend beyond respective sides of the second volume in the rotation plane in either direction of rotation.

2. The sonar transducer assembly according to claim 1, wherein the housing is mountable to the water craft to enable approximately 360 degree rotation of the at least one transmit-only transducer element and the at least one receive-only transducer element with respect to the water craft.

3. The sonar transducer assembly according to claim 1, wherein the at least one receive-only transducer element is further configured to convert sound energy of the sonar returns into sonar return data, and wherein the sonar transducer assembly further comprises a sonar signal processor configured to receive sonar return data resulting from the at least one receive-only transducer element and process the sonar return data to produce sonar image data for the corresponding second volume, wherein the sonar signal processor is further configured to create an image of an underwater environment as a composite of sonar images derived from the sonar image data of the second volumes respectively arranged in positions corresponding to the rotation of the at least one transmit-only transducer and the at least one receive-only transducer.

4. The sonar transducer assembly according to claim 3 further comprising a heading sensor configured to detect the heading of the at least one receive-only transducer element, wherein the detected heading of the at least one receive-only transducer element is associated with sonar return data for each second volume, and wherein the sonar signal processor is configured to create the image of the underwater environment based on the detected heading and associated sonar return data and a heading of the water craft.

5. The sonar transducer assembly according to claim 3, wherein the sonar signal processor is configured to process sonar returns to produce three-dimensional sonar image data, and wherein the sonar signal processor is configured to create a three-dimensional image of the underwater environment based on the three-dimensional sonar image data.

6. The sonar transducer assembly according to claim 3 further comprising a sensor configured to detect rotational movement of the at least one receive-only transducer element, wherein the detected rotational movement of the at least one receive-only transducer element is associated with sonar return data for each second volume, and wherein the sonar signal processor is configured to create the image of the underwater environment based on the detected rotational movement and associated sonar return data.

7. The sonar transducer assembly according to claim 1, wherein the first volume is defined by a square-shaped beam, and wherein the square-shaped beam is defined by a relatively wide beamwidth in the first plane and the second plane.

8. The sonar transducer assembly according to claim 1, wherein the at least one receive-only transducer element is configured to receive sonar returns from sonar pulses of the at least one transmit-only transducer element while the at least one transmit-only transducer element and the at least one receive-only transducer element are rotated at variable speeds.

9. The sonar transducer assembly according to claim 1, wherein the at least one receive-only transducer element is configured to receive sonar returns from sonar pulses of the at least one transmit-only transducer element while the at least one transmit-only transducer element and the at least one receive-only transducer element are rotated at a user-defined speed.

10. The sonar transducer assembly according to claim 1, wherein the at least one receive-only transducer element is configured to receive sonar returns from sonar pulses of the at least one transmit-only transducer element without the need to pause rotation of the at least one transmit-only transducer element and the at least one receive-only transducer element.

11. The sonar transducer assembly according to claim 1, wherein the fan-shaped beam defines approximately a 2 degree angle in the first plane.

12. The sonar transducer assembly according to claim 1, wherein the first volume is defined by a square-shaped beam, and wherein the square-shaped beam defines approximately a 30 degree angle in the first plane.

13. The sonar transducer assembly according to claim 1 further comprising a second receive-only transducer element positioned within the housing and aimed outwardly and downwardly, wherein the second receive-only transducer element is configured to receive sonar returns from the sonar pulses within a third volume defined by a second fan-shaped beam, wherein the second fan-shaped beam is defined by a relatively narrow beamwidth in the first plane and a relatively wide beamwidth in the second plane, wherein the third volume is smaller than the first volume, wherein the at least one second receive-only transducer element is aimed within the housing such that the third volume is different than the second volume and wholly contained within the first volume.

14. The sonar transducer assembly according to claim 1 further comprising:
at least one second transmit-only transducer element positioned within the housing and aimed outwardly and downwardly, wherein the at, least one second transmit-only transducer element is configured to transmit sonar pulses to insonify a third volume different than the first volume;
at least one second receive-only transducer element positioned within the housing and aimed outwardly and downwardly, wherein the at least one second receive-only transducer element is configured to receive sonar returns from the sonar pulses of the at least one second transmit-only transducer element within a fourth volume defined by a second fan-shaped beam, wherein the second fan-shaped beam is defined by a relatively narrow beamwidth in the first plane and a relatively wide beamwidth in the second plane, wherein the fourth volume is smaller than the third volume, wherein the at least one second receive-only transducer element is aimed within the housing such that the fourth volume is wholly contained within the third volume; and wherein the housing is mountable to the water craft so as to enable rotation of the at least one first transmit-only transducer element, the at least one first receive-only transducer element, the at least one second transmit-only transducer element, and the at least one second receive-only transducer element with respect to the water craft.

15. The sonar transducer assembly according to claim 1, wherein the at least one receive-only transducer element defines a phased array receiver.

16. The sonar transducer assembly according to claim 1, wherein the housing is configured to enable 360 degree rotation of the at least one transmit-only transducer element and the at least one receive-only transducer element.

17. The sonar transducer assembly according to claim 1, wherein the housing is configured to be mounted to a rotatable trolling motor so as to enable 360 degree rotation of the at least one transmit-only transducer element and the at least one receive-only transducer element.

18. The sonar transducer assembly according to claim 1, wherein the at least one transmit-only transducer element is configured to transmit sonar pulses to insonify a first volume by varying a frequency within each sonar pulse.

19. The sonar transducer assembly according to claim 1 further comprising:
transmitter circuitry in communication with the at least one transmit-only transducer element, wherein the transmitter circuitry is configured to transfer a transmit signal to the transmit-only transducer element to cause the transmit-only transducer element to transmit the sonar pulses; and
receiver circuitry in communication with the receive-only transducer element, wherein the receiver circuitry is configured to transfer said sonar return data from the receive-only transducer element for processing and generation of sonar image data for display to a user.

20. A sonar system for a water craft, the sonar system comprising:
a transducer assembly comprising:
at least one transmit-only transducer element positioned within a housing and aimed outwardly and downwardly, wherein the at least one transmit-only transducer element is configured to transmit sonar pulses within a transmit beam to insonify a first volume;
at least one receive-only transducer element positioned within the housing and aimed outwardly and downwardly, wherein the at least one receive-only transducer element is configured to receive sonar returns from the sonar pulses within a second volume defined by a fan-shaped beam, wherein the fan-shaped beam is defined by a relatively narrow beamwidth in a first plane and a relatively wide beamwidth in a second plane that is perpendicular to the first plane, wherein the second volume is smaller than the first volume, wherein the at least one receive-only transducer element is aimed within the housing such that the second volume is wholly contained within the first volume such that a first portion of the transmit beam defining the first volume extends beyond one side of the fan-shaped beam defining the second volume in the first plane and a second portion of the transmit beam defining the first volume extends beyond another side of the fan-shaped beam defining the second volume in the first plane, wherein the at least one receive-only transducer element is further configured to convert sound energy of the sonar returns into sonar return data;

wherein the at least one transmit-only transducer element is distinct from the at least one receive-only transducer element; and wherein the housing is mountable to the water craft so as to enable rotation of the at least one transmit-only transducer element and the at least one receive-only transducer element with respect to the water craft within a rotation plane, wherein the at least one transmit-only transducer element and the at least one receive-only transducer element are aimed within the housing in a fixed direction with respect to each other so as to rotate together such that the first portion and the second portion of the transmit beam extend beyond respective sides of the second volume in the rotation plane in either direction of rotation; and a sonar module configured to enable operable communication with the at least one transmit-only transducer element and the at least one receive-only transducer element, the sonar module including:
a sonar signal processor to process sonar return signals, and
at least one transceiver configured to provide communication between the transducer assembly and the sonar signal processor, wherein the sonar signal processor is configured to receive sonar return data resulting from the at least one receive-only transducer element and process the sonar return data to produce sonar image data for the corresponding second volume, wherein the sonar signal processor is further configured to create an image of an underwater environment as a composite of sonar images derived from the sonar image data of the second volumes respectively arranged in positions corresponding to the rotation of the at least one transmit-only transducer and the at least one receive-only transducer.

21. The sonar system according to claim 20 further comprising a heading sensor configured to detect the heading of the at least one receive-only transducer element, wherein the detected heading of the at least one receive-only transducer element is associated with sonar return data for each second volume, and wherein the sonar signal processor is configured to create the image of the underwater environment based on the detected heading and associated sonar return data and a heading of the water craft.

22. The sonar system according to claim 20, wherein the at least one receive-only transducer element is configured to receive sonar returns from sonar pulses of the at least one transmit-only transducer element while the at least one transmit-only transducer element and the at least one receive-only transducer element are rotated at a user-defined speed.

23. The sonar system according to claim 20, wherein the housing is mountable to the water craft to enable approximately 360 degree rotation of the at least one transmit-only transducer element and the at least one receive-only transducer element with respect to the water craft.

24. The sonar system according to claim 20 further comprising:
transmitter circuitry in communication with the at least one transmit-only transducer element, wherein the transmitter circuitry is configured to transfer a transmit signal to the transmit-only transducer element to cause the transmit-only transducer element to transmit the sonar pulses; and receiver circuitry in communication with the receive-only transducer element, wherein the receiver circuitry is configured to transfer said sonar return data from the receive-only transducer element to the sonar signal processor.

25. The sonar system according to claim 20, wherein the at least one transmit-only transducer element is configured to transmit sonar pulses to insonify a first volume by varying a frequency within each sonar pulse.

26. The sonar system according to claim 20 further comprising a sensor configured to detect rotational movement of the at least one receive-only transducer element, wherein the detected rotational movement of the at least one receive-only transducer element is associated with sonar return data for each second volume, and wherein the sonar signal processor is configured to create the image of the underwater environment based on the detected rotational movement and associated sonar return data.

27. A method for assembling a sonar transducer system for a water craft, the method comprising:

providing a housing mountable to a water craft so as to enable 360 degree rotation of at least one transmit-only transducer element and at least one receive-only transducer element;

mounting the at least one transmit-only transducer element within the housing to aim outwardly and downwardly, wherein the at least one transmit-only transducer element is configured to transmit sonar pulses within a transmit beam to insonify a first volume; and mounting the at least one receive-only transducer element within the housing to aim outwardly and downwardly, wherein the housing is mountable to the water craft so as to enable rotation of the at least one transmit-only transducer element and the at least one receive-only transducer element with respect to the water craft within a rotation plane, wherein the at least one receive-only transducer element is configured to receive sonar returns from the sonar pulses within a second volume defined by a fan-shaped beam, wherein the fan-shaped beam is defined by a relatively narrow beamwidth in a first plane and a relatively wide beamwidth in a second plane that is perpendicular to the first plane, wherein the second volume is smaller than the first volume, wherein the at least one receive-only transducer element is aimed within the housing such that the second volume is wholly contained within the first volume such that a first portion of the transmit beam defining the first volume extends beyond one side of the fan-shaped beam defining the second volume in the first plane and a second portion of the transmit beam defining the first volume extends beyond another side of the fan-shaped beam defining the second volume in the first plane, wherein the at least one receive-only transducer element is further configured to convert sound energy of the sonar returns into sonar return data, wherein the at least one transmit-only transducer element is distinct from the at least one receive-only transducer element, wherein the at least one transmit-only transducer element and the at least one receive-only transducer element are aimed within the housing in a fixed direction with respect to each other so as to rotate together such that the first portion and the second portion of the transmit beam extend beyond respective sides of the second volume in the rotation plane in either direction of rotation.

28. A method for imaging an underwater environment beneath a water craft, the method comprising:

transmitting sonar pulses from at least one transmit-only transducer element positioned within a housing and aimed outwardly and downwardly, wherein each of the sonar pulses is transmitted within a transmit beam so as to insonify a first volume;

receiving sonar returns from the sonar pulses with at least one receive-only transducer element positioned within the housing and aimed outwardly and downwardly, wherein the housing is mountable to the water craft so as to enable rotation of the at least one transmit-only transducer element and the at least one receive-only transducer element with respect to the water craft within a rotation plane, wherein the at least one receive-only transducer element is configured to receive sonar returns from the sonar pulses within a second volume defined by a fan-shaped beam, wherein the fan-shaped beam is defined by a relatively narrow beamwidth in a first plane and a relatively wide beamwidth in a second plane that is perpendicular to the first plane, wherein the second volume is smaller than the first volume, wherein the at least one receive-only transducer element is aimed within the housing such that the second volume is wholly contained within the first volume such that a first portion of the transmit beam defining the first volume extends beyond one side of the fan-shaped beam defining the second volume in the first plane and a second portion of the transmit beam defining the first volume extends beyond another side of the fan-shaped beam defining the second volume in the first plane, wherein the at least one receive-only transducer element is further configured to convert sound energy of the sonar returns into sonar return data, wherein the at least one transmit-only transducer element is distinct from the at least one receive-only transducer element, wherein the at least one transmit-only transducer element and the at least one receive-only transducer element are aimed within the housing in a fixed direction with respect to each other so as to rotate together such that the first portion and the second portion of the transmit beam extend beyond respective sides of the second volume in the rotation plane in either direction of rotation; and processing, by a sonar signal processor, the sonar return data received from the at least one receive-only transducer element to produce sonar image data for display to a user.

29. The method according to claim 28, wherein the housing is mountable to the water craft to enable approximately 360 degree rotation of the at least one transmit-only transducer element and the at least one receive-only transducer element with respect to the water craft.

30. The method according to claim 28 further comprising:

transferring a transmit signal through transmitter circuitry in communication with the at least one transmit-only transducer element to cause the at least one transmit-only transducer element to transmit the sonar pulses; and transferring the sonar return data indicative of the sonar returns received by the at least one receive-only transducer element through a first receiver circuitry in communication with the at least one receive-only transducer element to the sonar signal processor.

31. The method according to claim 28 further comprising:

processing the sonar return data to produce sonar image data for the corresponding second volume; and creating an image of the underwater environment as a composite of sonar images derived from the sonar image data of the second volumes respectively arranged in positions corresponding to the rotation of the at least one transmit-only transducer and the at least one receive-only transducer.

* * * * *